(12) United States Patent
Murray et al.

(10) Patent No.: US 12,123,447 B2
(45) Date of Patent: Oct. 22, 2024

(54) PANEL CLIP ASSEMBLY AND RELATED METHOD OF USE

(71) Applicant: A. RAYMOND ET CIE, Grenoble (FR)

(72) Inventors: Michael Murray, Birmingham, MI (US); Miroslaw Przybyl, Lake Orion, MI (US)

(73) Assignee: A. RAYMOND ET CIE, Grenoble (FR)

( * ) Notice: Subject to any disclaimer, the term of this patent is extended or adjusted under 35 U.S.C. 154(b) by 132 days.

(21) Appl. No.: 17/901,194

(22) Filed: Sep. 1, 2022

(65) Prior Publication Data
US 2024/0018983 A1 Jan. 18, 2024

Related U.S. Application Data

(63) Continuation-in-part of application No. 17/863,008, filed on Jul. 12, 2022.

(51) Int. Cl.
*F16B 2/22* (2006.01)
(52) U.S. Cl.
CPC ..................... *F16B 2/22* (2013.01)
(58) Field of Classification Search
CPC ...... F16B 2/20; F16B 19/1081; F16B 21/086; F16B 2/22; F16B 21/075; F16B 5/0685; F16B 37/02; F16B 37/043; F16B 45/002; F16B 43/004
See application file for complete search history.

(56) References Cited

U.S. PATENT DOCUMENTS

| | | | | |
|---|---|---|---|---|
| 7,637,527 | B2* | 12/2009 | Mazanek | F16B 5/065 280/730.2 |
| 8,579,570 | B2* | 11/2013 | Fellows | F16B 37/0842 411/177 |
| 8,646,155 | B2 | 2/2014 | Ribes Marti | |
| 9,086,086 | B2* | 7/2015 | Bentrim | F16B 21/02 |
| 10,800,371 | B2* | 10/2020 | Marini | F16B 21/065 |
| 11,015,632 | B2* | 5/2021 | De Jong | F16B 2/245 |
| 11,608,849 | B2* | 3/2023 | Liebelt | F16B 21/075 |
| 2014/0109357 | A1 | 4/2014 | Fischer | |

(Continued)

FOREIGN PATENT DOCUMENTS

| | | |
|---|---|---|
| DE | 202010004995 U1 | 10/2011 |
| DE | 102016004336 A1 | 10/2017 |
| DE | 102016004337 A1 | 10/2017 |

(Continued)

*Primary Examiner* — Robert Sandy
*Assistant Examiner* — Louis A Mercado
(74) *Attorney, Agent, or Firm* — WARNER NORCROSS + JUDD LLP

(57) ABSTRACT

A clip assembly is provided including a clip having a support leg joined with a control arm, an actuator, and a displacement control element operable to engage the control arm and hold the support leg in a retracted mode. The actuator is movable relative to the clip and/or a carrier associated with the clip to disengage the displacement control element from the control arm and thereby deploy the associated support leg from the body to secure the clip to the panel. The clip can include a retention leg to retain the clip relative to the panel upon installation of the clip relative to the panel. A related method of use is provided.

20 Claims, 13 Drawing Sheets

(56) References Cited

U.S. PATENT DOCUMENTS

2015/0132078 A1* 5/2015 Yamamoto .............. F16B 21/12
                                                                       411/22

FOREIGN PATENT DOCUMENTS

| DE | 102018006297 A1 | 2/2020 |
| --- | --- | --- |
| EP | 2687731 A1 | 1/2014 |
| EP | 2937575 A1 | 10/2015 |
| WO | 2012104250 A1 | 8/2012 |
| WO | 2012129233 A1 | 9/2012 |
| WO | 2016192840 A1 | 12/2016 |
| WO | 2017016651 A1 | 2/2017 |
| WO | 2018104421 A1 | 6/2018 |
| WO | 2018219799 A1 | 12/2018 |

* cited by examiner

PANEL CLIP ASSEMBLY AND RELATED METHOD OF USE

BACKGROUND OF THE INVENTION

The present invention relates to a clip assembly, and more particularly to a panel clip assembly having a removeable guide pin operable to place and actuate a clip, thereby securing the clip to a panel.

In a variety of industries, it is common to attach a clip to a panel so that another component can be joined with the panel via interaction of a stud with the previously attached clip. For example, in the automotive industry, interior and exterior panels can be outfitted with a hole in a panel. A clip can be mounted in the hole to form a firm mounting structure in the hole and to the panel, typically buttressing the panel and preventing deformation of the panel after installation of a stud and a component attached to the stud. The clip can include a functional or aesthetic border that mounts adjacent the exposed or A side of the panel. A base attached to the border can project through the hole to the interior or B side of the panel. The base can include opposing arms that are pressed toward one another as they pass and engage the perimeter of the hole, then spring outward after the base passes through the hole to automatically engage the B side of the panel, thereby securing the panel between the arms and the trim, from the B side and A side of the panel respectively. With the clip so installed in the panel, another component including a stud can be moved toward the panel, with the stud entering the clip and the clip thus latching to the stud via the arms. In turn, the component is secured to the panel via the interaction of the stud with the clip.

While conventional clips are adequate to fasten components to some panels, they suffer some shortcomings. For example, many panel clips are placed manually by a worker. The clips are typically small, and sometimes have sharp edges. Thus, they can be difficult for a worker to grasp and firmly hold when installing in a panel. The size and shape of some clips also make it difficult to adequately align the clip with a hole in a panel to precisely and positively set the clip in the hole. When a clip is improperly set, it sometimes can become dislodged or separated from the hole and panel. As a result, any associated component attached via the clip can separate from the panel. This can cause the component to freely move around, causing a vibration or rattle, or a compromised structural integrity issue for the component and surrounding environment.

In addition, many clips are designed to be pressed through a hole in a panel in a manner that does not bend or warp the panel. Thus, the arms that subsequently retain the clip in the panel are limited so that they can properly bend when pressed through the hole. In turn, a clip might not provide enough holding strength due to the weaker arms. As a result, components attached to the panel with the clip can sometimes pull the clip out of the panel, thereby damaging the panel and/or the component, or simply allowing the component to dangle or fall from the panel. Either situation can lead to operation or warranty issues with regard to the vehicle, equipment or other product associated with the clip and component.

Placement of the clip also can require a fair degree of experience. For example, many times, arms on the B side of the clip will only partially engage the panel. An inexperienced user might not appreciate this, and assume that the arms are fully deployed to engage the B side of the panel, when in fact the arms are still partly compressed by engaging the perimeter of the hole and not fully expanded. As a result, the clip and any attached component can become separated from the panel, causing the issues mentioned above.

Accordingly, there remains room for improvement in the field of clip assemblies to facilitate consistent and effective installation, as well as adequate securement, thereof to panels.

SUMMARY OF THE INVENTION

A clip assembly is provided including a clip having a support leg joined with a control arm and an actuator operable to move the control arm and hold the support leg in a retracted mode.

In one embodiment, the actuator can have a grasping element and a key that includes a displacement control element. The actuator can be in the form of a grenade pin that is removable from the clip to disengage the displacement control element from the control arm and thereby deploy the associated support leg from the body to secure the clip to a substrate, such as a panel.

In another embodiment, the grenade pin can be engageable with the control arm and/or support leg to retain the support leg in the retracted mode to ensure no or minimal contact between the support leg and the substrate during installation of the clip assembly relative to the substrate.

In still another embodiment, the clip can include a retention leg to retain the clip relative to the panel upon installation of the clip relative to the panel. The retention leg can be separate and distal from the support leg and control arm, and can automatically engage the panel when the clip is installed relative to the panel, rather than being controlled by the disposition of the grenade pin.

In yet another embodiment, the grenade pin is operable in a first mode in which the grenade pin extends within a key hole defined by the base. A first displacement control element can engage the first control arm to hold a first support leg in the retracted mode. A second displacement control element can engage the second control arm to hold the second support leg in the retracted mode.

In even another embodiment, the grenade pin is operable in a second mode in which the grenade pin is removed from the key hole such that the first support leg and the second support leg extend to an extended mode. Accordingly, the first support leg and second support leg can engage the substrate, such as a panel, to prevent removal of the clip assembly from the panel aperture. Where a retention leg is included, the retention leg, and both support legs cooperate with one another to provide improved holding force to impair the clip assembly from being removed from the substrate or panel.

In yet even another embodiment, the grenade pin can include a retention element that engages the base to retain the key inserted in the key hole. The retention element can include a shoulder and a flange. A border element surrounding the key hole can be trapped between the shoulder and the flange when the grenade pin is in the first mode.

In a further embodiment, wherein the grasping element forms a ring through which a user can place a digit to manipulate and precisely place the clip assembly relative to a hole.

In still a further embodiment, the body defines a void below the base. The void can be bounded by one or more sidewalls. The sidewalls can define one or more slots through which the respective support legs can project in the extended mode. The sidewalls also can include one or more retention legs integrally formed therewith and extending outward from exterior surfaces of the sidewalls adjacent the slots.

In yet a further embodiment, the body can include a sidewall. The sidewall can be joined with a loop extending therefrom to the control arm. The displacement control element can selectively engage the control arm so that the control arm is displaced a greater distance from the sidewall when the support leg is in the retracted mode than in the extended mode.

In even a further embodiment, the body defines a central plane. The first support leg can be biased toward the central plane via interaction of the first displacement control element with the first control arm, which is joined with the first support leg.

In another embodiment, a method is provided. The method can include providing a clip in a panel aperture of a panel, the clip including a retention leg to retain the clip relative to the panel, the body including a support leg distal from the retention leg, the support leg joined with a control arm and in a retracted mode; and removing a grenade pin from the clip to disengage a displacement control element of the grenade pin from the control arm and thereby deploy the support leg from the body in an extended mode to secure the clip to the panel while the retention leg retains the clip relative to the panel.

In still another embodiment, the method can include removing the displacement control element from a position located between the sidewall and the control arm. In some cases, the method can include simultaneously deploying a plurality of other support legs from slots defined by the body upon removal of the grenade pin from the body.

In yet another embodiment, the method can include preparing the clip assembly for use in which the support legs are urged into the body of the clip, or retracted into that body. To do so, the grenade pin can be installed relative to the base. The key of the grenade pin can enter the keyhole and void of the body. In so doing, the displacement control elements, in the form of ribs, can provide displacement control of the support legs, urging them to the retracted mode upon engagement with the control arms.

In even another embodiment, the control arms can be joined via a connector to the support legs. The displacement control elements can slide along the control arms to push them toward a center of the body, away from a sidewall. As this occurs, the movement of the control arms translates to the support legs which are withdrawn or retracted to the retracted mode and readied for installation though a panel aperture, providing adequate clearance therethrough in this transportation position.

In a further embodiment, the method can include retaining the grenade pin in the key hole by locking a retention element in place. The grenade pin can include the retention element that engages the base to retain the key inserted in the key hole. The retention element can include a shoulder and a flange. A border element of the base can be trapped between the shoulder and the flange when the grenade pin is in the first mode, thus locking the grenade pin relative to the clip for transport.

In still a further embodiment, the actuator can be a threaded fastener operably coupled to a displacement control element that engages the control arm and holds the support leg retracted relative to the body in a first mode, and that engages the control arm permitting the support leg to extend relative to the body in a second mode in which the support leg engages the second side of the panel if the base is pulled away from the first side of the panel.

In yet a further embodiment, the clip assembly can include a carrier moveably disposed in the body. The carrier can include the displacement control element and defining a threaded aperture to threadably receive the threaded fastener. The carrier can be operable in the first mode in which the threaded fastener extends at least partially through the hole, with the displacement control element engaging the control arm to hold the support leg in the retracted mode. The carrier can be operable in a second mode, in which the threaded fastener is rotated relative to the threaded aperture such that the support leg extends to the extended mode such that the support leg is configured to engage the second side of the panel to prevent removal of the clip assembly from the panel aperture.

In even a further embodiment, a method of using the clip assembly is provided. The method can include providing a clip in a panel aperture of a panel, the clip including a retention leg to retain the clip relative to the panel, the body including a support leg distal from the retention leg, the support leg joined with a control arm and in a retracted mode; and rotating an actuator relative to a carrier rotatably constrained by the clip to disengage a displacement control element of the carrier from the control arm and thereby deploy the support leg from the body in an extended mode to secure the clip to the panel while the retention leg retains the clip relative to the panel.

In another embodiment, the body can include a sidewall. The step of rotating in the method can result in the displacement control element being removed from a position between the sidewall and the control arm.

The current embodiments provide a clip assembly that retains its configuration for transport and is easily and efficiently installed by a user. Where the clip assembly includes the actuator, which can be a grenade pin, the clip can be quickly, precisely and accurately installed relative to a panel aperture. The grenade pin can assist guiding the clip into and through the panel aperture. Where the grenade pin includes snap lock features, the grenade pin can remain well secured to the clip during transportation of the clip assembly. Where the clip assembly includes the retention legs, those legs can provide tactile feedback to inform a user that the clip is adequately installed. Where the grenade pin can be used to deploy the support legs from the body of the clip, those legs can provide additional stability and support to secure the clip to the panel, within the aperture.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of

DETAILED DESCRIPTION OF THE CURRENT EMBODIMENTS

Figure 1:
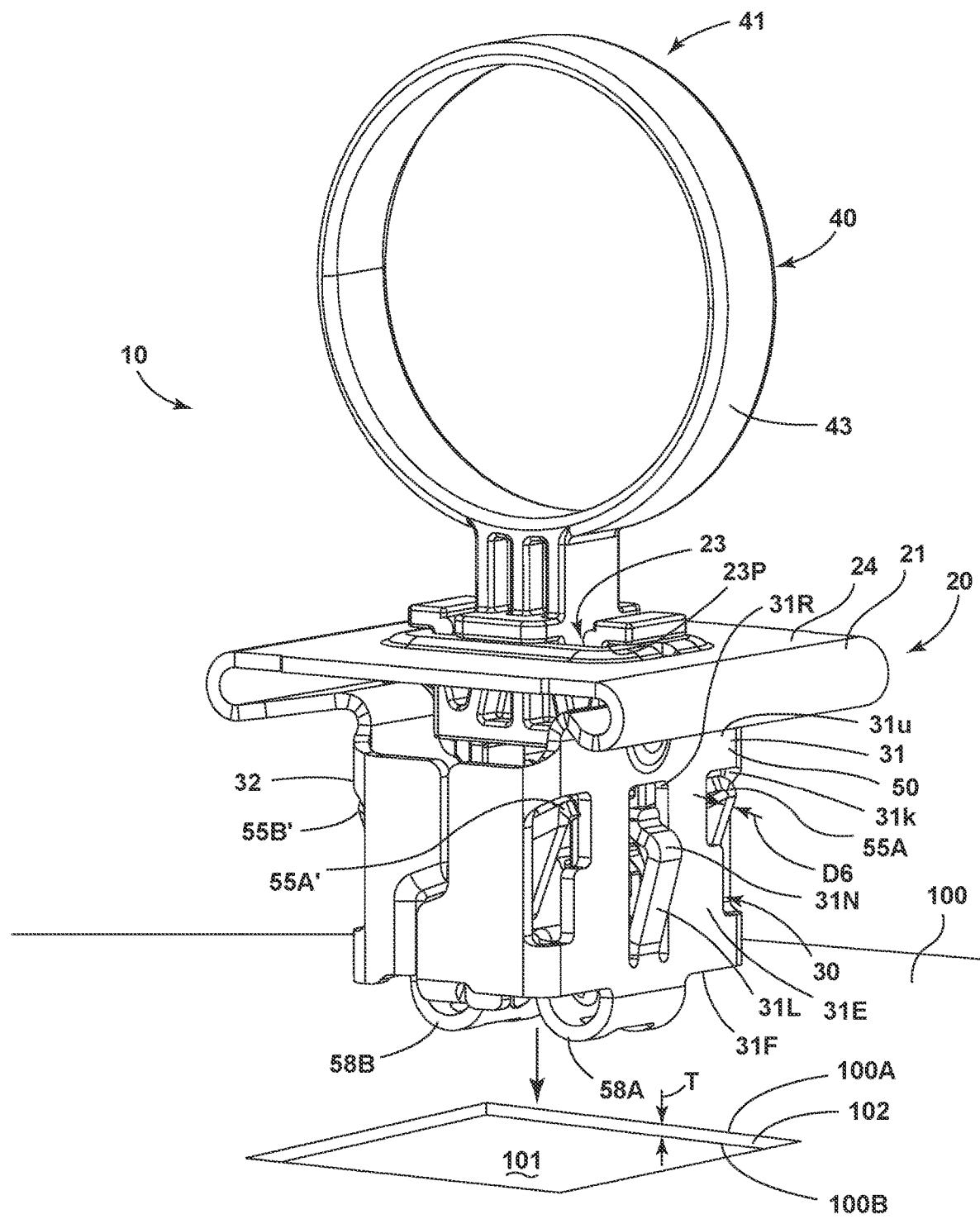
FIG. 1 is a perspective view of the clip assembly of a current embodiment including a grenade clip installed in a clip and readied for installation in a panel aperture defined by a panel.

A current embodiment of the clip assembly is shown in FIGS. 1-7 and generally designated 10. The clip assembly 10 can be installed relative to and/or applied or fixed to any panel 100, which optionally can define a panel aperture 101 bounded by a panel aperture perimeter 102. As used herein, a panel can refer to any type of substrate, and need not be a flat, planar or sheet like material, and can include three-dimensional parts or assemblies. The panel 100 shown in FIG. 1, however, can be of a generally flat configuration with a thickness T extending from an exterior or A side 100A of the substrate or panel to an interior of B side 100B of the panel 100. The panel can be any type of interior or exterior panel used, for example in vehicles, equipment, machines, or other products or assemblies. In the setting described herein, the panel can be in the form of an interior or exterior trim or structural panel of a vehicle, such as an automobile.

With reference to FIGS. 1-4, the clip assembly 10 can include a clip 20 having a base 21 and a body 30, with an actuator 40 that includes an insertion or extraction feature. The actuator 40 can be in the form of a grenade pin, as better shown in FIG. 3. There, the grenade pin can include a grasping element 43 at a proximal end 41 of the grenade pin 40. One or more displacement control elements 44A and 44B can be disposed at or near the distal end 42 of the grenade pin 40. Between the proximal end 41 and the distal end 42, the grenade pin 40 can include a retention element 45. The retention element can ensure that the grenade pin 40 does not become dislodged from, fall or otherwise become dissociated from the clip 20 during transportation of the clip assembly 10. The retention feature 45 can come in a variety of different forms. As shown, the retention feature 45 can include a shoulder 45S distal from a flange 45F. Between the shoulder 45S and the flange 45F a recess or indentation 45R can be formed. The retention feature 45 can be duplicated on opposing sides of the longitudinal axis LA of the actuator 40. The retention feature 45 can be joined via a retention feature arm 45A to a main actuator key 46. The retention feature arm 45 can be configured to be bent, flexed, deformed or otherwise modified such that the flange and/or shoulder can be moved and/or biased toward and away from the key 46 in directions M, depending on whether the grenade pin 40 is being installed or removed from the clip 20. This movement can be effectuated when a ramped surface of the shoulder 45S engages a portion of a keyhole 23 and in particular a keyhole perimeter 23P when the grenade pin 40 is initially installed relative to the clip 30. The shoulder 45S can be ramped to facilitate insertion of the grenade pin and thus the key 46 into the keyhole 23. Although shown as a shoulder and flange type retention feature, the retention feature 45 can be replaced with any other types of any other variety of other structures to retain the grenade pin 40 relative to the clip 30.

The grenade pin 40 as mentioned above can include the grasping element 43, which is shown to be in the form of a ring attached to an upper portion of the key 46. The ring can be a circular or annular shaped ring, but optionally can be of other cross-sections and/or shapes. In some cases, the grasping element 43 can be the form of a button or pin which simply can be grasped by a user. In other cases, the grasping element 43 can be in the form of an L or T shaped handle to allow the user to grasp the grenade pin 40 and move it relative to the clip 30 as described below.

Figure 3:
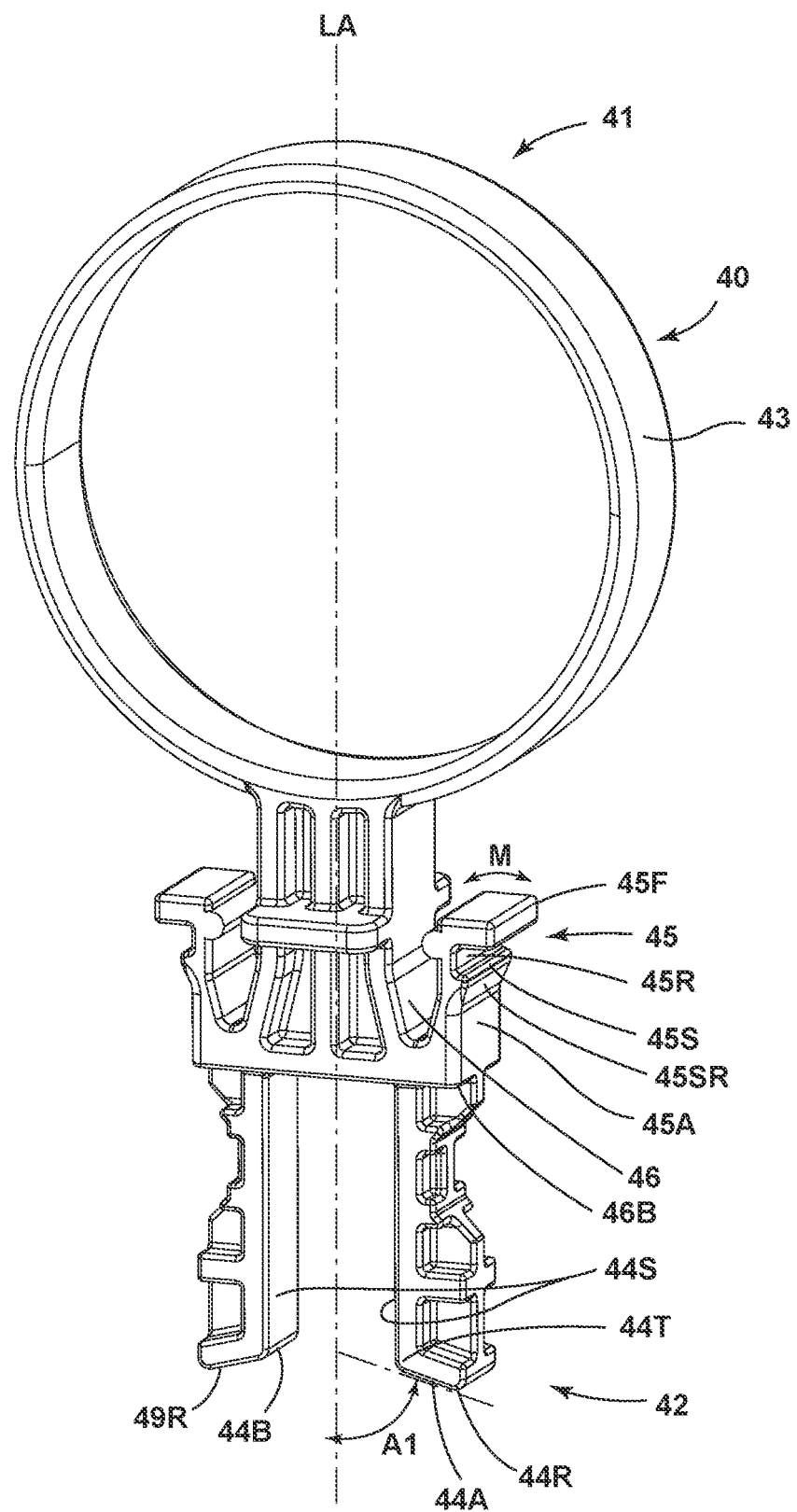
FIG. 3 is a perspective view of the grenade pin with its grasping ring, snap lock feature and control displacement arms.

The actuator or grenade pin 40 can further include a first displacement control element 44A and second displacement control element 44B. These elements as shown in FIG. 3, can extend downward and below the retention features 45. These displacement control elements can be disposed on opposite sides longitudinal axis LA and central plane CP as described below. Of course, in some applications, one of the displacement control elements can be eliminated such that only a single element is used. In other applications, there can be multiple additional displacement control elements in different locations, optionally surrounding the longitudinal axis LA, and in different quadrants. Depending on the configuration of the clip 30 with which the displacement control elements interact, each displacement control element can be in the form of an arm extending from a key base 46B of the key 46. For example, the arm 44A can extend downward from the key base 46B. The arm 44A can include a lower ramped surface 44R which can be disposed at an angle A1 relative to the longitudinal axis LA. This angle A1 optionally can be less than 90°, between 0° and 90°, inclusive, between 0° and 60°, inclusive, between 0° and 45°, inclusive or other angles depending on the application and the intended interaction of the ramped surface 44R with a portion of the clip 20 as described below. The interior parts closer to the longitudinal axis of the arms 44A and 44B can each include an interior engagement surface 44S that can engage a portion of the control arms 54A, 54B of the clip and/or support legs 55A, as described below. The interior engagement surfaces 44S can transition to the ramped surfaces 44R, optionally at a curved portion 44T so that any portion of the clip that rides along the ramp 44R can cleanly transition to the interior surface 44S.

The grenade pin 40 can be configured to be installed relative to the clip 20 through the keyhole 23, the base 21 and into the body 30 of the clip 20. The one or more displacement control elements 44A and 44B can be configured to engage the control arms 54A and 54B respectively of the body, which in turn withdraws or retracts the support legs 55A, 55B, 55B' relative to the body 30 of the clip 20, ensuring that those support legs 55A and do not make substantial contact with the panel 100 or substrate 100, particularly around the perimeter 102 of the panel aperture 101 during installation or insertion of the clip assembly relative to the panel.

Figure 4:
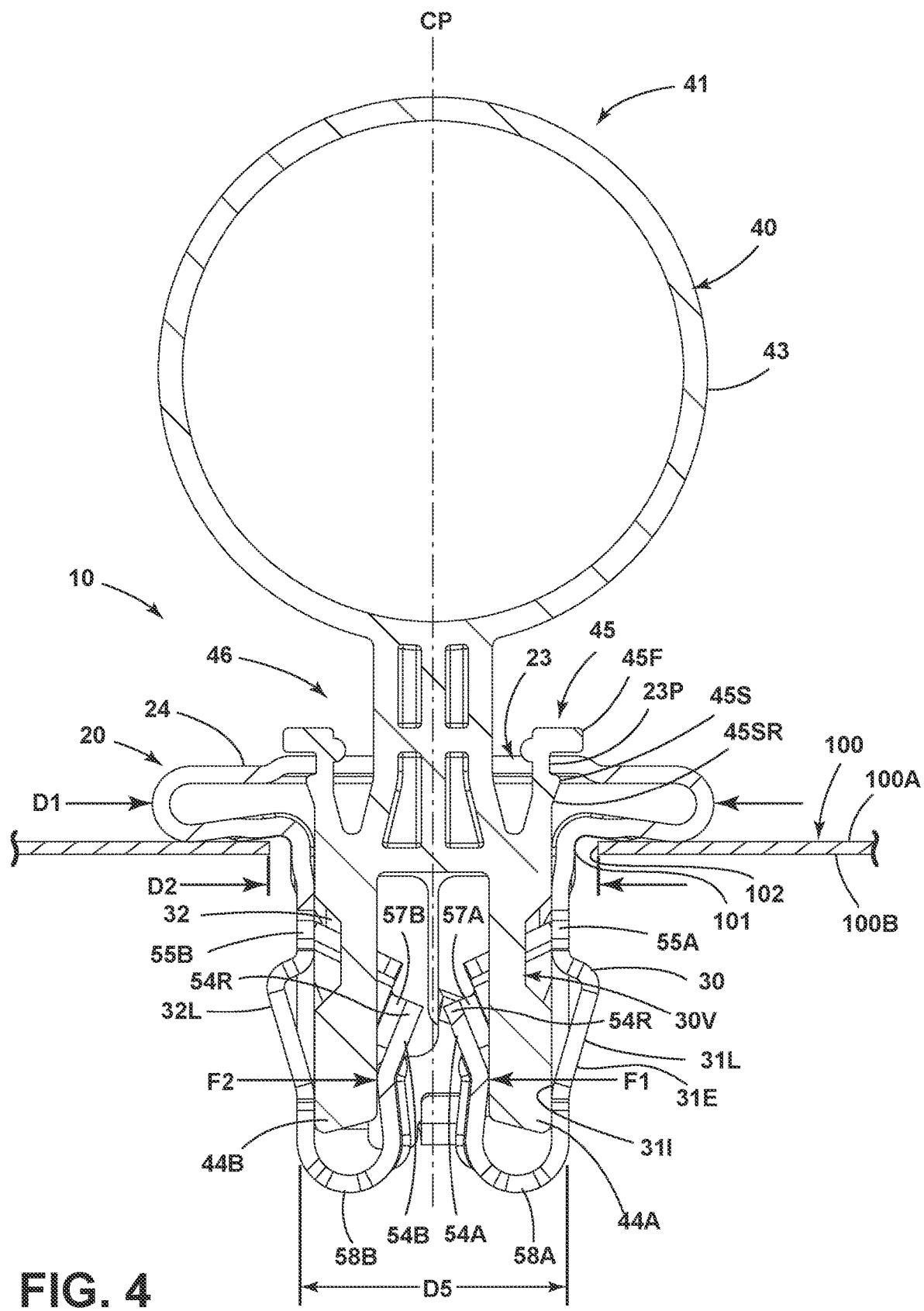
FIG. 4 is a side section view of the clip assembly installed relative to the panel aperture of the panel and support legs in a retracted mode before deployment.

With reference to FIGS. 1-4, the clip 20 will now be described in more detail. The clip 20 optionally can be constructed from a variety of materials, such as metal, polymers, composites and combinations thereof. The clip can be a stamped metal part, such as a plate or sheet. The part can be configured to include a variety of three-dimensional contours and aspects as shown. The clip can be stamped or formed to include the base 21 and body 30. The base 21 can define the keyhole 23 and a border element 24 that extends around the keyhole 23. The border element 24 can be of a greater dimension D1 than the dimension D2 of the aperture 101 defined by the panel 100 as shown in FIG. 4. This can be so that the border element does not allow the clip 20 to be pushed through the panel aperture 101. The border element 24 also can be configured so as to conceal or cover a substantial, if not all, portion of the panel aperture 101 and its perimeter 102. The base 21 can include the keyhole perimeter 23P which can engage the retention element 45 of the grenade pin 40 so that the grenade pin can be retained relative to the clip 20 at this location. Although shown as including two different levels, one above the other, the clip base 21 can include a single level sheet and/or plate which is configured to be disposed adjacent the A side 100A of the panel 100, optionally engaging and contacting that A side when the clip assembly 10 is initially and/or permanently installed.

The base 21 can transition to one or more opposing side walls 31, 32 of the body of the clip 20. The base 21 can transition to the side walls 31, 32 via a curved and/or contoured portion. Each of the sidewalls 31, 32 can transition downward from and an upper portion to a lower portion. For example, the first sidewall 31 can include an upper portion 31U and a lower portion 31F. The other sidewalls and ends of the body 30 can include similar features so will not be repeated here. The upper portion 31U can transition to the base 21. The lower portion 31F can be distal from the upper portion 31U. Between the upper portion 31U and the lower portion 31F, the sidewall 31 can include an interior 31I and an exterior 31E. The interior can face toward and form a portion of a void 30V that is defined by the body 30. This void can extend from the keyhole aperture 23 to the lower portions of the sidewalls of the body. The key 46 of the grenade pin 40 can extend through the keyhole 23 and downward into the void below the base 20.

Figure 2:
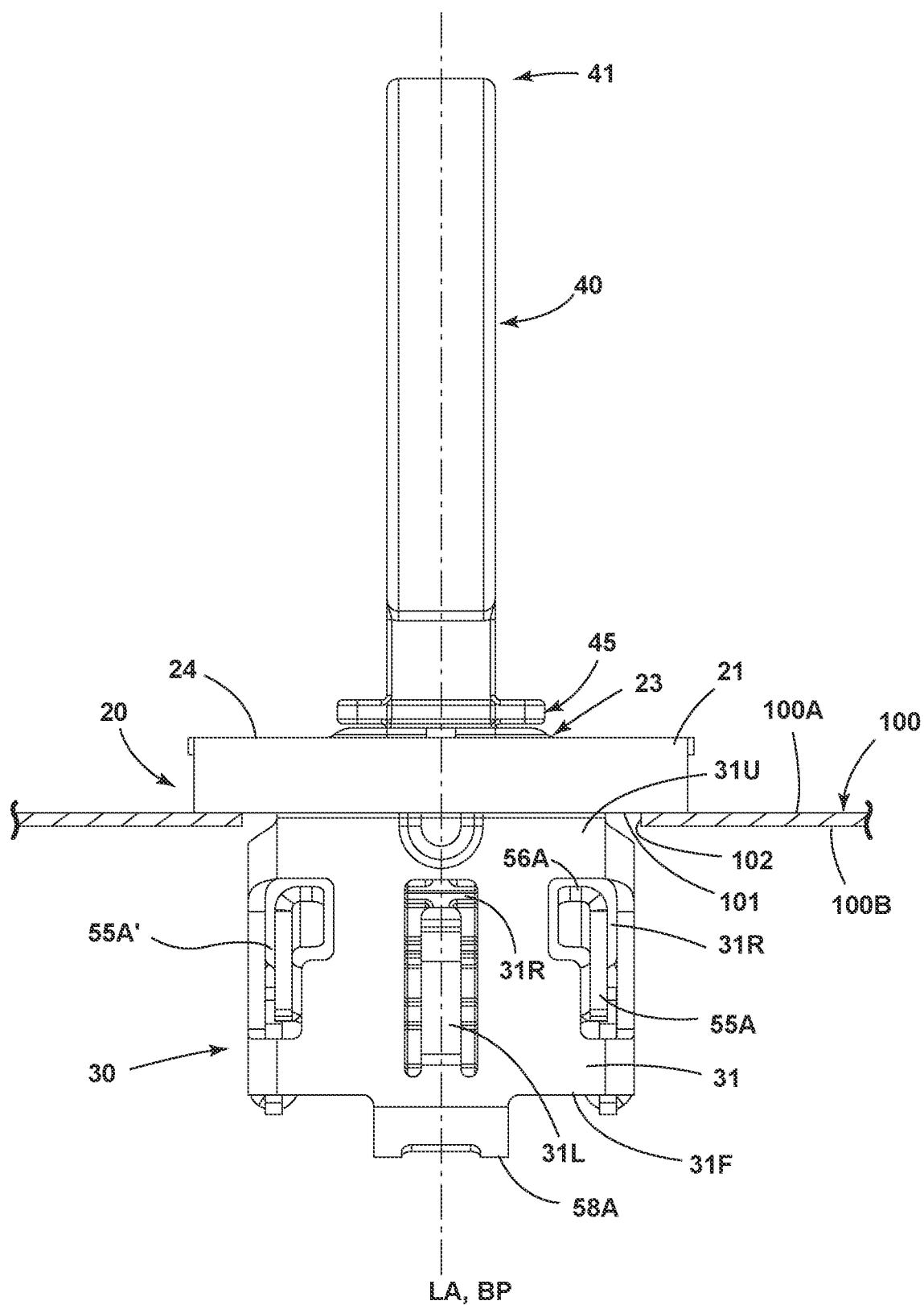
FIG. 2 is a side view thereof.
Figure 5:
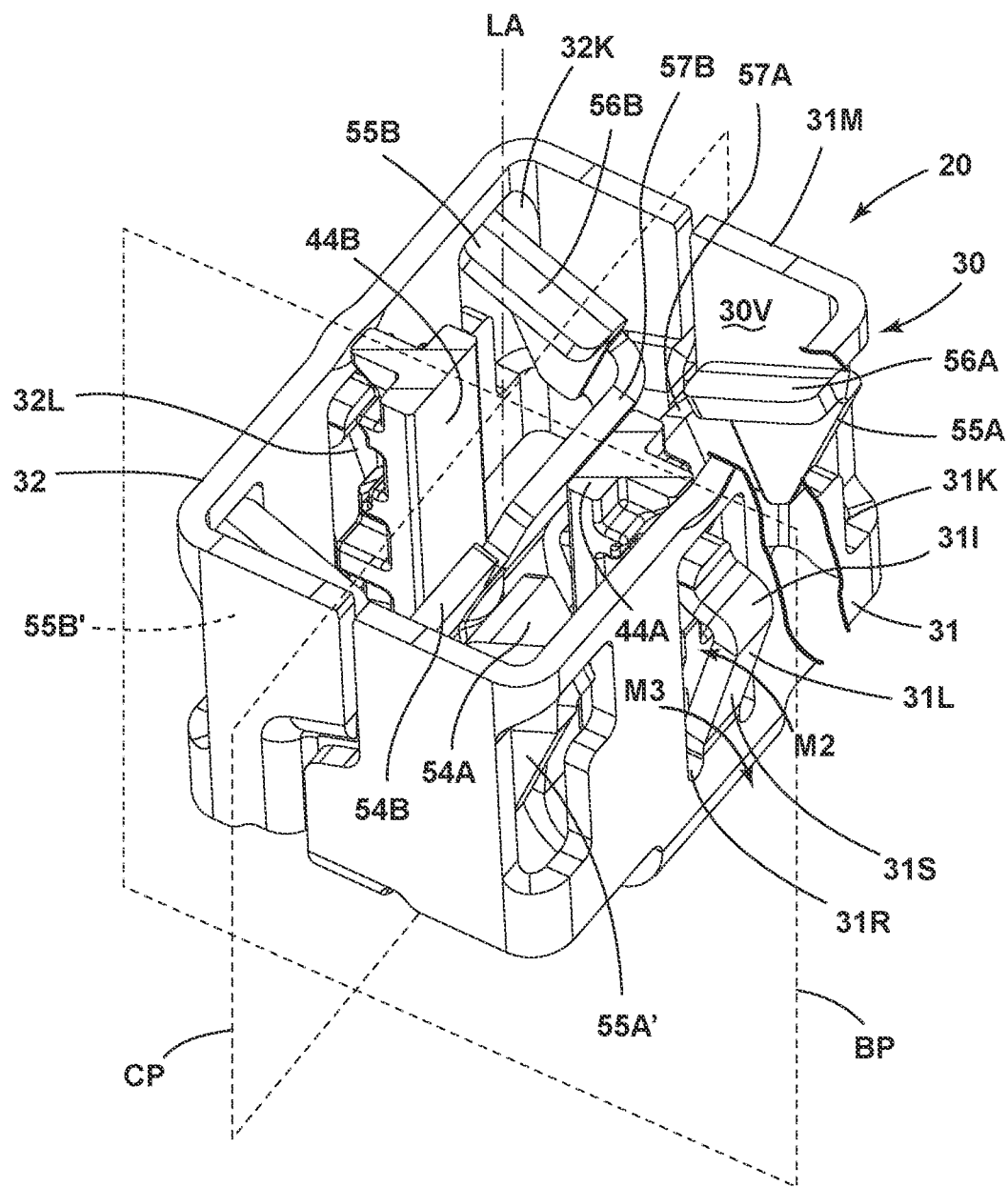
FIG. 5 is a top perspective section view of the clip assembly with the support legs in a retracted mode before deployment.

With reference to FIGS. 1, 2 and 4, the sidewall 31 can include a retention leg 31L that is disposed within a retention leg recess 31R. The retention leg 31L can be disposed generally in the middle of the sidewall 31 and aligned with longitudinal axis LA. The retention leg 31L can move in direction M2 when compressed during insertion of the clip body 30 relative to the panel 100 and through the panel aperture 101. The retention leg 31L can include a ramped surface 31S that promotes sliding of the leg 31L relative to the perimeter 102 of the panel aperture 101 being disposed through the panel. The features of the retention leg 31L can be duplicated on a second retention leg 32L that can be disposed on the opposite side of the body 30 of the clip 20 as shown in FIG. 5. That second leg 32L can be disposed on and formed by at least a portion of the second sidewall 32 that opposes the first sidewall 31. It can move similarly to the first leg 31L as well.

Generally, the retention leg 31L is configured to retract and move in direction M2 when the ramped surface 31S engages and slides along the perimeter 101 of the 102 of the panel aperture 101. Moving in direction M2, the retention legs can move toward one another and toward a central plane CP defined by the body 30 of the clip 20. After passing the panel perimeter 102, the legs 31L and 32L can move in direction M3, generally away from the central plane CP, to an extended mode, when they reach the second or beside 100B of the panel. When the first and second retention legs extend to that extended mode, as shown in FIGS. 4 and 5, these retention legs can hold or retain the clip assembly 10 relative to the panel 100, at least in a temporary configuration as shown there.

Optionally, the retention legs are configured to automatically deploy after they are compressed and biased inward toward the central plane CP with the shoulder 31N subsequently passing by the perimeter 102 of the panel aperture 101. The retention legs can offer some temporary retaining function of the clip relative to the panel. This retaining function, however, can be enhanced via the additional retaining support provided by the support legs 55A, 55A', 55B, 55B', which can be deployed via use of the actuator 40 as described below.

As further shown in FIGS. 1, 2, 4 and 5, the body 30 can be constructed to include one or more support legs 55A, 55A', 55B, 55B'. The support legs as mentioned above can be configured to extend from the respective sidewalls 31 and 32 in an extended mode, shown in FIG. 6, to fully capture and retrain the clip 20 relative to the panel 100 and in particular the panel aperture 101, after the actuator 40 is removed therefrom. Because the various support legs operate and are constructed similar to one another, only the first support leg 55A will be described in substantial detail here.

Figure 6:
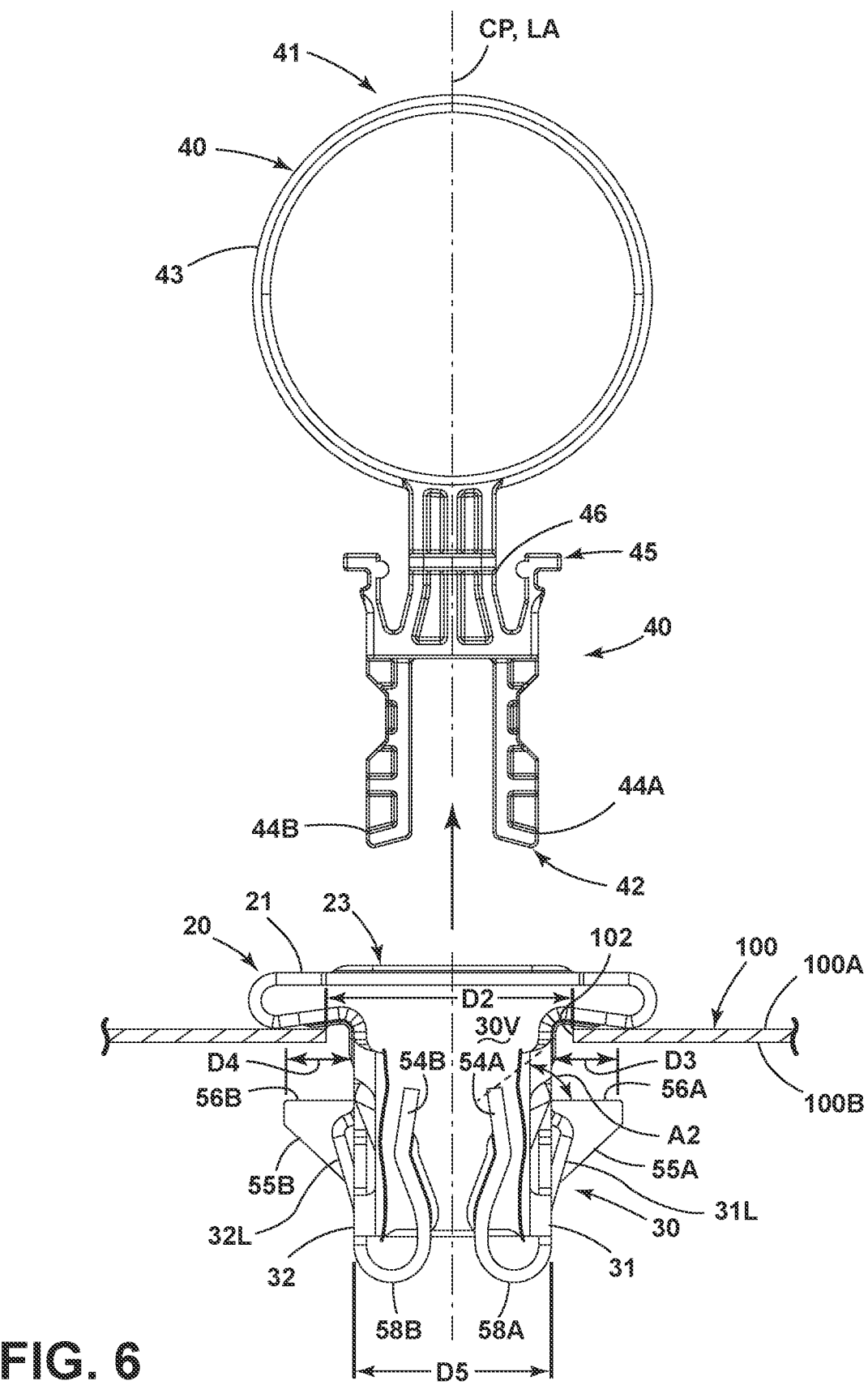
FIG. 6 is a side section view of the clip assembly installed relative to the panel aperture of the panel and support legs in an extended mode after deployment and removal of the grenade pin to provide such deployment.
Figure 7:
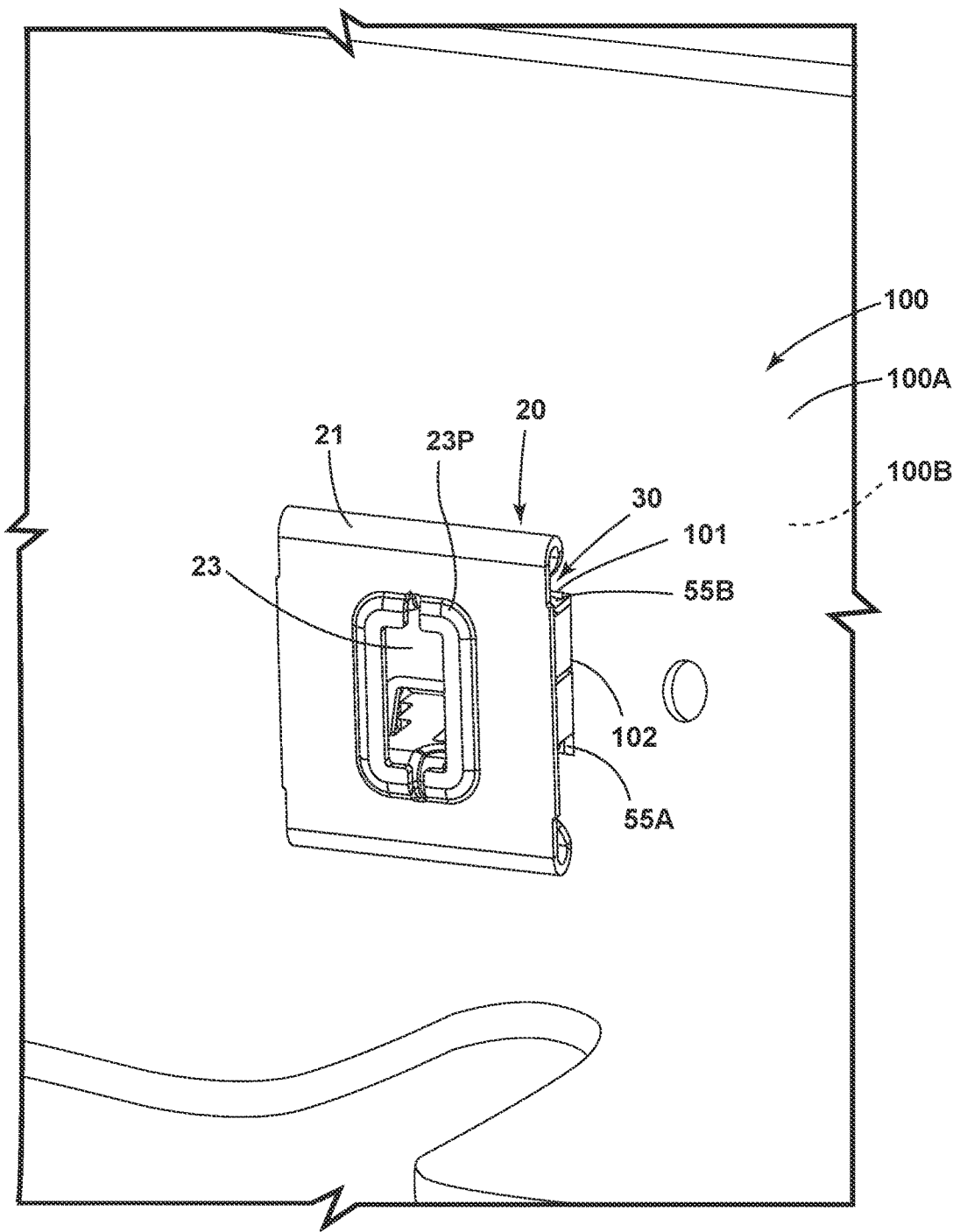
FIG. 7 is a perspective view of the clip assembly fully installed relative to the panel.

The first support leg 55A, with reference to FIGS. 4, 5 and 6, can include a stop surface 56A. The stop surface can be in the form of a shoulder or ledge having a flat or contoured surface. The stop surface 56A can be configured to be held within the void 30V when the support leg 55A is in the retracted mode. The stop surface 56A can be configured to be deployed and extend outward from the sidewall 31 when the support legs are in the extended or deployed mode. In the extended mode, the stop surface 56A can extend a distance D3 outward from the sidewall 31. Likewise, in the extended mode, the second support leg 56B on the opposite side of the central plane CP can extend a distance D4 outward from the second sidewall 32.

Optionally, in the extended or deployed mode, the support legs can provide an overall width of the clip body including distances D3 and D4, as well as distance D5, which can be the distance between the side walls 31 and 32. The sum of these distances D3, D4 and D5 can be greater than the overall width or dimension D2 of the aperture. The respective stop surfaces 56A and 56B can be configured to engage the interior or B side 100B of the panel 100 to prevent extraction or the removal of the clip 20 relative to the panel 100 and panel aperture 101 after the grenade pin 40 is removed from the clip 20.

Returning to FIGS. 4-6, the support legs 55A and 55B can be mounted on opposing sides of the central plane CP and distal from the respective retention legs 31L and 32L on the respective first side wall 31 and second sidewall 32. The first sidewall 31 and second sidewall 32 can each define first 31K and second 32K sidewall slots adjacent the end 31M of the body 30. The slots can be configured so that the respective first and second support legs can project through those slots and outward away from the sidewalls the distances D3 and D4 as described above when the support legs are in the extended mode. The slots can be irregular in shape, but of course can take on other configurations, such as rectangular, oval or rounded, depending on the application. The slots can be aligned with the respective support legs and stop surfaces so that the edges of the slots do not interfere with movement of the support legs and stop surfaces extending therethrough.

Each of the respective support legs can be constructed to extend through the respective support leg slots different distances in the retracted versus the extended mode. For example, as shown in FIGS. 1 and 4, the first leg 55A extends a distance D6 relative to the slot 31K when the first support leg 55A is in the retracted mode. This distance D6 optionally can be 0 mm, or such that the first support leg 55A does not extend at all through the slot or sidewall, but instead is retained entirely behind the sidewall, within the void 30V of the clip 20. When the first support leg 55A is deployed upon actuation via the grenade pin 40 being pulled out from the clip 20, that first support leg 55A can be deployed distance D3, shown in FIG. 6 from the sidewall 31. This distance D3 can be greater than the distance D6 when the support leg is in the retracted or undeployed mode shown in FIG. 1. Put another way, the second distance D6 can be less than the first distance D3 as the first support leg 55A extends through the first support leg slot 56A. When in the extended mode, the first distance D3 optionally can be at least 1 mm, at least 2 mm, at least 3 mm, at least 4 mm, at least 5 mm, at least 6 mm, at least 7 mm, at least 8 mm, at least 9 mm, at least 10 mm, at least 15 mm, at least 20 mm, at least 25 mm or other distances depending on the application and retention functionality of the clip relative to the panel 100.

The body 30 and the clip 20 can be configured such that each of the support legs are joined with respective control arms via connectors. As shown in FIG. 4, the first support leg is joined with a first control arm 54A, while the second support leg 55B is joined with a second control arm 54B. This connection can be made via respective connectors 57A and 57B. These connectors can be integrally formed with a respective support legs and control arms. For example, the first support leg 55A can be formed from the same homogeneous piece of material as the connector 57A. The connector 57A can extend away from the end 31M of the body 30 toward a bisecting plane BP that is perpendicular to a central plane CP as described above. The connector 57A can transition and be joined with the first control arm 54A which optionally can be perpendicular to the bisecting plane BP but parallel to the central plane CP. This connection of the first control arm 54A to the first support leg 55A of the connector 57A can allow all of these components to move in unison, that is, when the control arm 54A is moved toward and/or away from the central plane CP, the leg 55A also moves toward and away from the central plane CP. As a result, the corresponding stop surface 56A can simultaneously move toward and away from the central plane CP. The stop surface 56A further optionally can move through an angle A2 (FIG. 6) as it does so because that surface can rotate about an axis during such movement.

As further shown in FIG. 4, the control arm 54A can be connected via a first loop 58A to the first side wall 31. Likewise, the opposing control arm 54B can be attached to the second sidewall 32 via a second loop 58B. These loops can be integrally formed with the sidewalls and the respective control arms, optionally having been stamped from a common piece of material such as metal, plastic, composite or combinations of the foregoing as mentioned above. The loop 58A can be constructed so that in its normal, unbiased configuration, it holds and secures the control arm 54A and thus the support leg 55A in the extended mode, shown in FIG. 6. The first loop 58A also can be configured so that it can be modified when the control arm to which is connected is forced, for example by force F1, exerted by the grenade pin 40 on the control arm 54A as described below. When this modification of the first loop 58A occurs, the first loop 58A stores energy within it. Accordingly, when the force F1 is removed, for example when the grenade pin 40 is removed, the loop will transfer that energy and force the control arm 54A and the connected support leg 55A to the extended mode.

As mentioned above, the clip 30 can include additional support legs 55A' and these support legs also can be joined with respective control first control arm 54A and second control arm 54B as well as the respective loops 58A and 58B. Thus the loops can affect movement of the additional optional support legs 55A' and 55B', which also can include connectors that further join with the respective first and second control arms.

The grenade pin 40 is removably joined with the clip 20 and operable in a first mode shown in FIGS. 1, 2, 4 and 5. The various support legs can operate in unison and can move simultaneously when the grenade pin 40 is removed from the clip 20. In the first mode, the grenade pin can be disposed such that it extends at least partially into and/or through the keyhole 23 defined by the base 21. Optionally, in this first mode, the grenade pin can be retained relative to the clip 20 via the retention element 45 as described above. Again, this retention element 45 can impair or prevent the grenade pin from being removed from the clip 20 and deploying the respective support legs prematurely. This retention in the first mode of the support legs can be provided during transport and/or assembly of the clip assembly 10 relative to a panel.

In the first mode, the key 46 of the grenade pin 40 also can interact with the various components of the body 30 to retain the support legs 55A, 55A', 55B, 55B' in the retracted mode. For example, as shown in FIGS. 4 and 5, the first and second displacement control elements 44A and 44B respectively engage the respective first control arm 54A and second control arm 54B, and exert the forces F1 and F2 on those control arms. In this configuration, because the control arms 54A and 54B are joined via connectors with the respective first support leg 55A and second support leg 55B, these first and second support legs are retained within the void, and/or generally do not pass substantially beyond the respective sidewalls 31, 32. As mentioned above, the first and second support legs are positioned within the void and aligned with the slots in this first mode, in which the support legs are retracted. The first and second displacement control elements 44A and 44B, or key arms, can be sufficiently rigid and reinforced such that they exert the forces F1 and F2 on the control arms and hold those arms in the retracted mode until the grenade pin 40 is removed. Optionally, although not shown, the respective key arms or displacement control elements can be of a sufficient thickness such that they can fill in the space between the respective sidewalls and control arms. For example, although not shown, the displacement control element 44A can be disposed between the interior surface 311 of the sidewall 31 can extend to the control arm 54A, such that the element contacts both components.

Generally, the displacement control element 44A can push the control arm 54A with a force F1 away from the sidewall 31 generally toward the central plane CP in the first mode of the grenade pin 40 shown for example in FIGS. 2-5. When the displacement control element 44A is removed from this space, the control arm 57A is free to move away from the central plane CP and generally toward the sidewall 31. In so doing, the joined support leg 55A can move through the respective slot 31K such that the leg and stop surface extend a distance D3 from the sidewall 31 as shown for example in FIG. 6 in the extended mode. Of course, the other displacement control element 44B can interact with the control arm 54B and second support leg 55B in a similar manner to deploy that second support leg simultaneously with the first support leg relative to the body 30 and sidewall 32. The support leg 55B also can move in a direction opposite the first leg 55A, away from the central plane CP and out through the respective slot 32K so that the second leg also attains the deployed or extended mode.

Optionally, the first support leg 55A and second support leg 55B are joined via the first connector 57A and second connector 57B respectively to the control arms 54A and 54B. All these respective components can move in unison when the first and second support legs transition to their respective extended mode. This can ensure that the support legs are both adequately deployed on opposing sides of the central plane CP so that the holding force provided by the respective support legs and stop surfaces will hold the clip 20 evenly, with equally distributed forces on both sides of the central plane. Of course, depending on application, the support legs can be deployed slightly out of synchronization by changing the configuration of the key arms 44A and 44B and/or the way that those arms engage the respective control arms 54A and 54B. For example, the slopes of the ramps and/or contours of the respective control arms or key arms can be modified to provide a different rate of extension of the respective support legs. Further optionally, the support legs can be modified so that they extend different distances D3 and D4 (FIG. 6) from the clip in certain applications. For example, although not shown, the support leg 55A can extend a distance D3 that is greater than the distance D4 by which the second support leg 55B extends from the body. This different distance extension can be designed depending on the placement of the clip and/or orientation of the clip relative to the panel and the type of component that is secured to the panel via the clip assembly 10. Even further optionally, the key arms or displacement control elements 44A and 44B can be modified or altered such that they are asymmetric about the central plane. By making the displacement control elements different, they can exert different or uneven forces F1 and F2 against the respective control arms, thereby causing those arms to deploy or extend the respective first and second support legs different amounts or at different rates when transitioning from a retracted mode to an extended mode.

Returning to FIG. 5, when in the extended mode, the respective legs 55A, 55A', 55B' as mentioned above extend below the base 21 the distances D3 and D4 outward from the respective sidewalls 31 and 32 of the body 30. Accordingly, any perimeter 102 or portion of the panel 100 surrounding the panel aperture 101 can be trapped between the stop surfaces 56A, 56B of the support legs and the base 21. With this trapping of the perimeter 102, the clip can be retained relative to the panel and the panel aperture. The support legs also can engage the panel directly or indirectly when the clip is pulled outward and away from the A side 100A of the panel. When the support legs and in particular the stop surfaces, for example 56A and 56B, engage the B side 100B of the panel 100, the clip is prevented from being removed from the panel. This can be particularly helpful when and/or after a stud (not shown) is inserted into the keyhole 23 of the clip 20 and thereby secured thereto. As mentioned above, that stud (not shown) can be attached to another component such as another panel, a portion of a wiring clip or harness, an accessory, or some other part or component that is suitable for attachment to the panel 100.

Methods of using the clip assembly 10 of the current embodiments will now be described with reference to FIGS. 1-6. As mentioned above, the clip 20 can be formed optionally by stamping a sheet of metal into the three-dimensional shapes and components described above, such as the base 21, the body 30, the respective retention legs 31L, 32L, and the respective support legs 55A, 55A', 55B, 55B', as well as all the other component such as the loops, control arms, connectors etc. The resulting clip 20 can define a keyhole 23 and a void 30V within the body 30. In an automated process or manually, the grenade pin 40 can be installed relative to the clip 20. To do so, the clip can be pushed into the keyhole 23 such that the displacement control arms 44A and 44B pass through the keyhole 32 and into the void 30V. As this occurs, the ramps 44S of the key arms 44A and 44B engage and slide along the respective ramps 54R of the control arms 54A and 54B. Due to their angled nature, the ramps slide relative to one another such that the control arms 54A and 54B transition inward under the forces F1 and F2 of the control displacement elements. As this occurs, the control arms move closer to the central plane CP. The respective support legs 55A and 55B also move inward, toward the central plane CP and inward or away from the sidewalls 31 and 32 of the body.

Insertion of the grenade pin 40 can continue, and in so doing, the optional retention feature 45 thereof can be actuated. The ramped surface 45S can ride along the perimeter 23P of the keyhole 23 and the respective arms of that retention feature can bend, flex or otherwise move inward. This continues until they later snap outward such that the perimeter 23P is trapped between the shoulder 45S and the flange 45F. In this configuration, the grenade pin 40 is retained relative to the clip 20 so it will not become dissociated from the clip during transportation or other manipulation. In this configuration, the support legs also are readied to the retracted mode for subsequent installation relative to a panel aperture.

With the grenade pin 40 installed relative to the clip 20, the clip assembly 10 can be moved, transferred, transported or otherwise readied for installation relative to a panel. During such installation, as shown in FIG. 1, the entire assembly 10 is moved toward the panel aperture 101. This movement can be affected by a user manually engaging the clip assembly 10. For example, the user can place a digit, such as a finger, through the grasping element 43, such as a ring, of the grenade pin 40 and can move the clip assembly 10 toward an aperture 101 defined by panel 100. As the body 30 of the clip is installed relative to the panel aperture 101, the retention legs 31L and 32L can engage the perimeter 102 of the aperture 101, sliding past that perimeter until the shoulder 31N of the first retention leg and the similar shoulder of the second retention leg pass beyond the perimeter 102. At this point, the perimeter 102 can be trapped between the base 21 and the shoulders of the retention legs, partially or temporarily holding or securing the clip 22 to the panel 100. At this point, the grenade pin or actuator 40 can remain in place and thus the support legs 55A, 55B, 55A' and 55B' all remain in their retracted mode or undeployed mode relative to the body 30.

When the clip assembly 20 is adequately placed in the aperture, as shown in FIGS. 2-4, the user can receive tactile feedback via the retention legs extending. In some cases, the user can gently tug on the grenade pin to ensure that those retention legs on the clip body are engaging the B side 100B of the panel 100. After confirming placement of the clip 20 relative to the panel, the user can then initiate a sequence of removing the grenade pin 40 and deploying the support legs from the body 30. Generally, the user can use the ring 43 and pull the grenade pin from the clip 20 to disengage the displacement control elements 44A and 44B of the grenade pin from the respective control arms 54A and 54B. In so doing, the support legs can be deployed from the body 30 to an extended mode to secure the clip to the panel while the retention legs 31L and 32L also simultaneously retain the clip relative to the panel.

More particularly, when the grenade pin 40 is pulled, as mentioned above, the retention feature 45 can disengage from the perimeter 23P of the base 21. The key 46 also can be withdrawn from the keyhole 23. In so doing, the control displacement elements or key arms 44A and 44B move upward, away from the loops 58A and 58B. As they do so, they eventually clear the ramps 54R of the respective control arms. As a result, the forces F1 and F2 are removed from the respective control arms. When this occurs, the stored energy in the control arms can move those respective control arms toward the respective first side wall 31 and second side wall 32 (or in other directions depending on the orientations of the arms). Because the control arms are joined or connected with the respective support legs 55A and 55B, with removal of the forces, those legs will move through and/or relative to the sidewalls and/or slots defined by the sidewalls. The support legs thus can extend to the extended mode or deployed mode shown in FIG. 6.

In the extended mode, the panel and perimeter 102 of the aperture 101 can be trapped between the base 21 and the respective support legs 55A and 55B thereby securing the clip to the panel. The grenade pin can be fully removed from the clip 20 to be recycled or reused. The clip 20 however remains secured to the panel. A stud, fastener, or other connector element can be installed to the clip 20 via the keyhole 23. The stud or other connector element can thereby secure to the installed clip 20 relative to the panel. As mentioned above, the stud can be connected to another panel, component or structure such that when the stud registers with the clip, through the keyhole 23, that other component or structure can be securely joined with and attached to the clip 20, and thus the panel 100.

Figure 8:
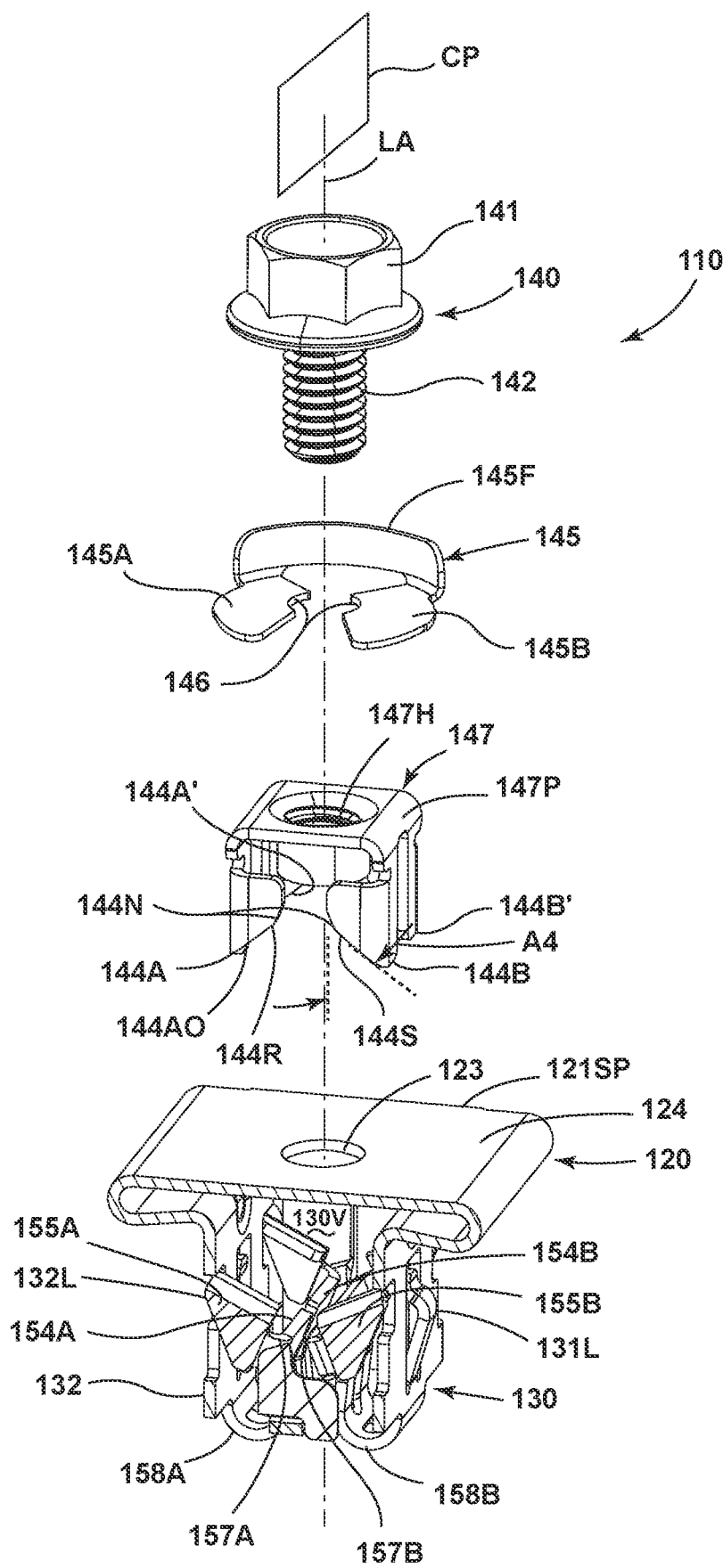
FIG. 8 is an exploded perspective view of a clip assembly of a first alternative embodiment.
Figure 9:
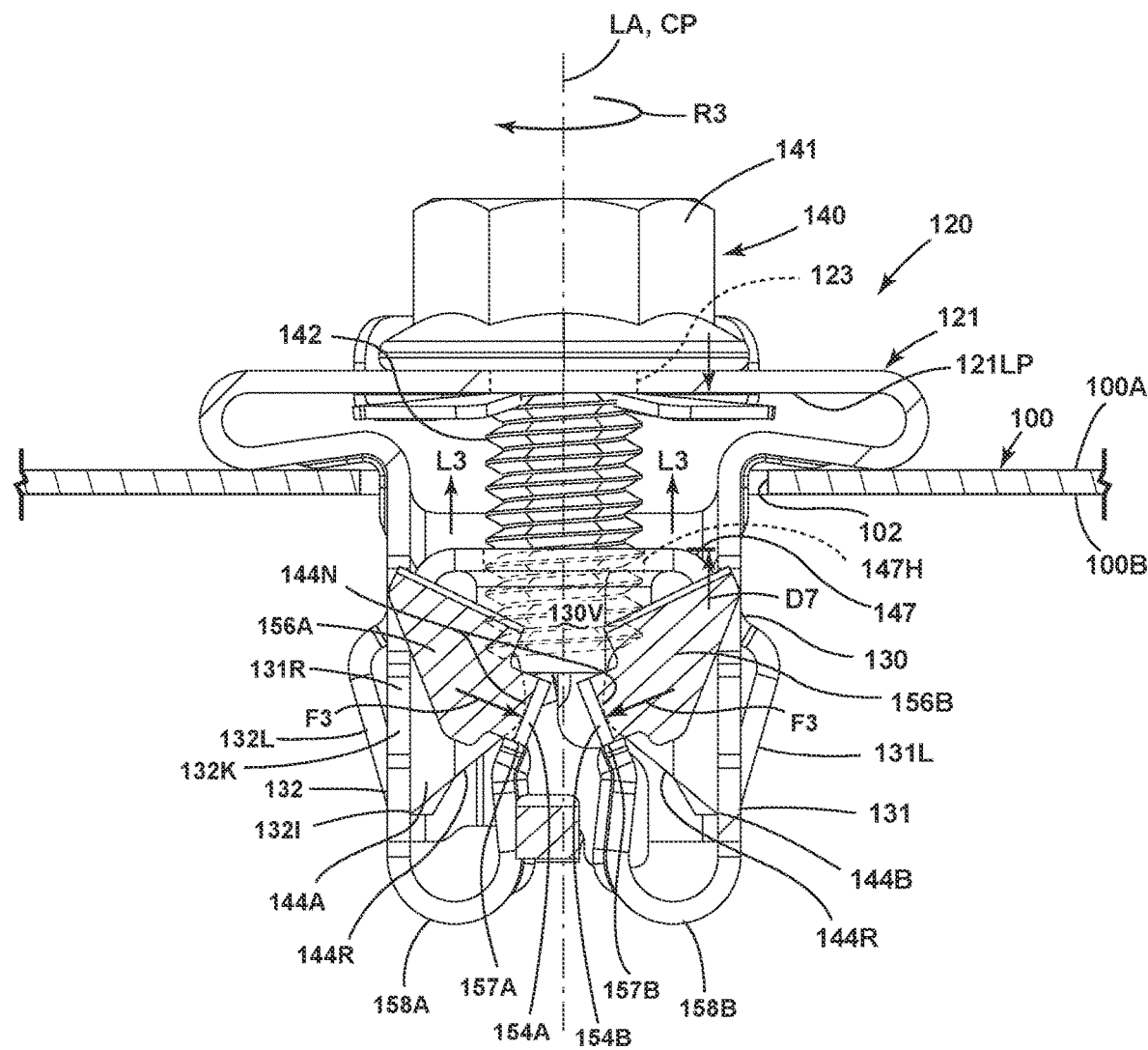
FIG. 9 is a side section view of the clip assembly of the first alternative embodiment installed relative to a panel aperture of a panel and support legs in a retracted mode before deployment.
Figure 10:
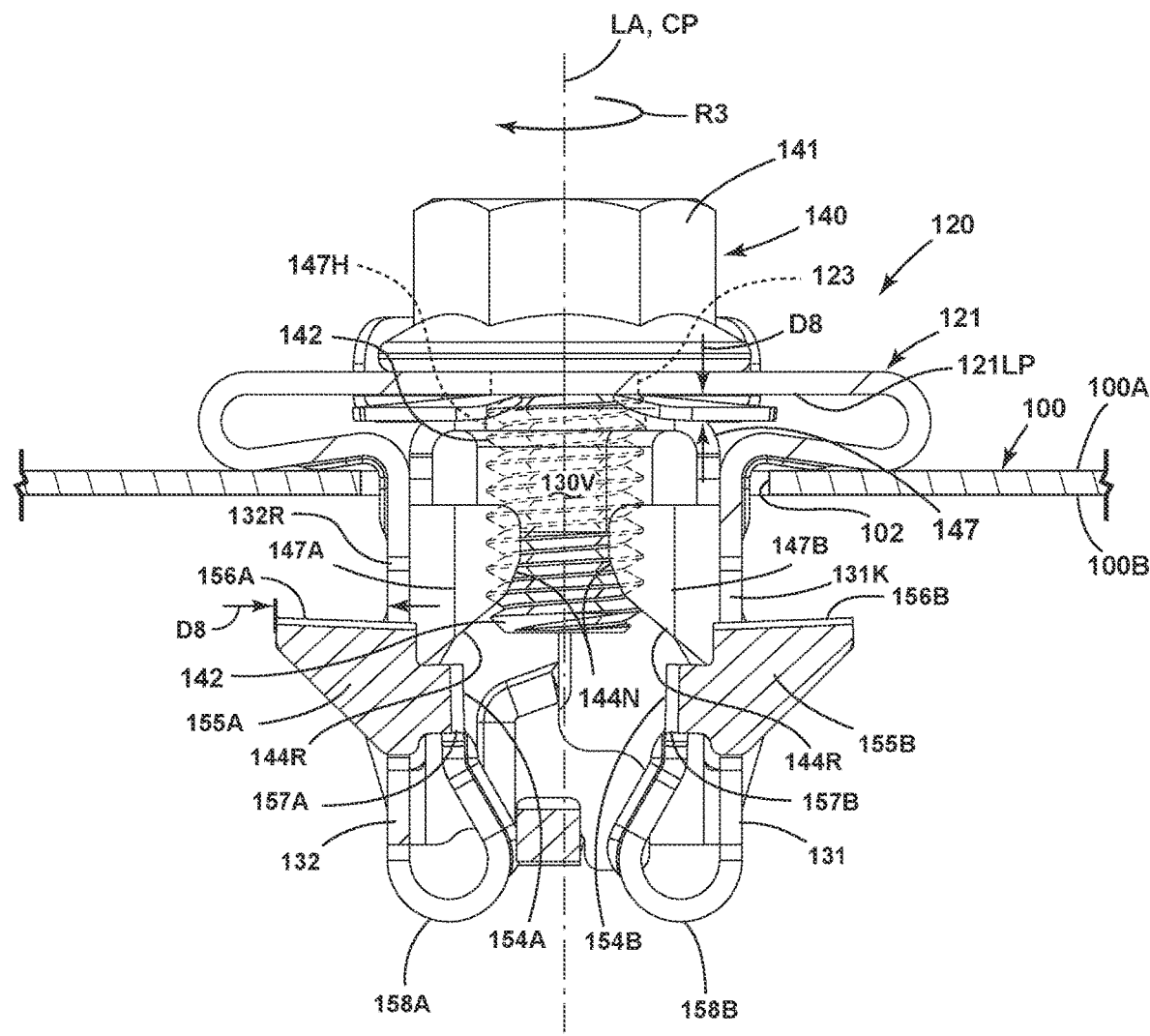
FIG. 10 is a side section view of the clip assembly of the first alternative embodiment installed relative to the panel aperture of the panel and support legs in an extended mode after deployment and movement of an actuator relative to a carrier to provide such deployment.

A first alternative embodiment of the clip assembly is shown in FIGS. 8-10, and generally designated 110 this clip assembly can be identical or similar to the current embodiment described above in structure, function and operation, with one or more exceptions. For example, the clip assembly 110, can include a clip 120 having a base 121 and a body 130, with an actuator 140. The actuator 140 can be in the form of a fastener including a head 141 and a threaded shaft 142 as shown in FIG. 8. The clip assembly 110 also can include a carrier 147. The carrier can be disposed within the body 130 and movable within the void 130V thereof. When moved, the carrier 147 can cause the one or more control arms 154A, 154B to move, thereby causing the respective support legs 155A, 155B, and any other support legs (155A', 155B') associated with the clip achieve a retracted mode and/or a deployed mode, identical to those modes described above in connection with the current embodiment of the clip assembly 10.

The threaded fastener or actuator 140 can include a head 141 with a drive feature, which as shown can be a hexagonal shaped head. Of course, other drive features, such as hexalobular holes or surfaces, screwdriver features, or other tool contours can be included in the head so a tool can be used to rotate the fastener. The head 141 can be connected to a threaded shaft 142. The threaded shaft can be configured to extend through a hole 123 defined by the base 121 of the clip 120 and into the void 130V of the body 130.

The actuator 140 can include or can be joined with a retention element 45. The retention element can ensure that the actuator 140 does not become dislodged from, fall or otherwise become dissociated from the clip 120 during transportation of the clip assembly 10. The retention element 145 can come in a variety of different forms. As shown in FIGS. 8 and 9, the retention element 145 can be in the form of a C-clip. The C-clip can include a flange or connector 145F that connects opposing minor plates 145A and 145B. These minor plates can include inner edges 146 that can directly engage the threads of the threaded shaft 142, gripping or otherwise securing the shaft so the fastener cannot be removed from the clip 120 when installed. When the fastener is rotated, the C-clip 145 can generally remain adjacent the base 121. As shown in FIG. 8, the minor plates 145A and 145B can be disposed between the lower surface 121LP of the base 121 and can engage that surface of the base 121 in general to secure the threaded fastener 140 to the base 121. The flange 145F can extend upward from the minor plates and can engage the base side wall or edge 121SP. When this occurs, the C-clip 145 is rotationally constrained and/or prevented from rotating relative to the fastener 140 and/or the base 121. In some cases, this flange 145F can be used to grasp and remove the C-clip 145 from the base and clip 120 in general. Of course, as shown, the C-clip 145 remains in place after installation of the clip assembly 110 relative to a panel 100. Other constructions for this retention element 145 also are contemplated.

Optionally, the threaded fastener or actuator 140 is rotatable for example in direction R3 relative to the clip assembly. When this occurs, the actuator rotates within the hole 123 defined by the base 121 and relative to the minor plates 145A and 145B. The threads engage the edges 146 of the C-clip 145. The C-clip again can be rotationally constrained and does not rotate with the fastener in direction R3. In some applications, the retention element 145 optionally can be removed from the fastener 140 after installation of the clip 120 relative to the panel 100.

The actuator 140 can be operably coupled to a carrier 147 to translate rotational movement of the actuator 140 to linear movement of the carrier relative to the body 130 and/or base 121 of the clip 120. In particular, the threaded shaft 142 can operably and threadably couple to the thread hole 147H of the carrier 147. This hole 147H can be defined in a top plate or block 147P of the carrier 147. This top plate or block 147P can fit within the void 130V. The top plate can be moveable and/or slidably disposed within the body 130 between the sidewalls 131 and 132 and generally between the retention legs 131L, 132L. Those retention legs can be joined with the respective sidewalls 131, 132 and can function identical to that of the retention legs of the current embodiment described above, and therefore will not be described again here.

The carrier 147 and in particular the top plate 147P can be configured so that it is rotationally constrained between the sidewalls 131 and 132. For example, when the threaded fastener 140 is rotated and the shaft 142 engages the threaded hole 147H of the carrier 147, the carrier does not rotate relative to the sidewalls. Instead, the rotational motion R3 of the fastener it can translate into a linear motion L3 as shown in FIG. 9. When it does so, the carrier 147 can move in direction L3 toward the base 121 of the clip 120. The distance between the lower surface 121LP of the base 121 also can decreases from a greater distance D7 shown in FIG. 9 to a lesser distance D8 shown in FIG. 10. Depending on the amount of actuation or movement desired of the support legs from a retracted mode shown in FIG. 9 to the extended mode shown in FIG. 10, the actuator and carrier can be selectively modified. This modification can be calibrated to promote the appropriate amount of deployment of the support legs 155A and 155B from the body.

The carrier 147 can include one or more displacement control elements 144A, 144B, 144A', 144B'. There may be fewer or greater displacement control elements than these, depending on the application. The displacement control elements can be in the form of legs that extend downward from the plate 147P of the carrier 147. The displacement control elements or legs 144A, 144B can be disposed on opposite sides of the central plane CP and/or longitudinal axis LA of the clip assembly 110. Each of the respective displacement control elements 144A and 144B, 144A' and 144B' can be identical to one another or mirror images of one another, so only displacement control element 144A will be described in detail here. This displacement control element 144A can extend away from the top plate 147P to a distal end 144AD, and in so doing can taper or become smaller in overall dimension. In some cases, the distal end can be of a lesser width than the width of the leg nearer the top plate. The displacement control element 144A can include a relatively squared off or planar outer sidewall 144S which optionally can connect to or be aligned with another adjacent displacement control element 144A'. With this construction, these sidewalls can engage and can provide rotational constraint of the carrier 147, so it does not rotate within the void 130V upon rotation of the actuator 140.

The displacement control element 144A can include a respective ramped surface 144R, which can be angled or rounded as shown. In one example, the lower ramped surface 144R can be disposed at an angle A4 relative to the longitudinal axis LA. This angle A4 optionally can be less than 90°, between 0° and 90°, inclusive, between 0° and 60°, inclusive, between 0° and 45°, inclusive or other angles depending on the application and the intended interaction of the ramped surface 144R with a portion of the clip 120, for example, the control arms 154A, 154B, as described above in connection with the current embodiment of the clip assembly 10. The interior parts, closer to the longitudinal axis LA or central plane CP, of the arms 144A and 144B can each include an interior engagement surface 144N that can directly and slidably engage a portion of the control arms 154A, 154B of the clip and/or support legs 155A, 155B as described below. The interior engagement surfaces 144N can transition to the ramped surfaces 144R, optionally at a curved portion so that any portion of the clip that rides along the ramp 144R can cleanly transition to the interior surface 144N. Of course, the ramped surface and interior engagement surfaces can include a variety of different types of contours depending on the particular engagement of that displacement control element with the control arm 154A, and thus the respective movement of the associated support legs 155A.

As mentioned above, the carrier 147 can be disposed in the void 130V within the body 130 of the clip 120. The carrier 147 can be disposed so that it can move vertically within that cavity, generally moving or sliding relative to the sidewalls 131, 132 as well as any end walls of the body. The carrier 147 can be disposed between the base 121 and the respective loops 158A and 158B that are joined with both the respective control arms 154A and 154B and the associated support legs 156A and 156B.

The respective control arms 154A, 154B and support legs 156A, 156B can be joined via respective connectors 157A, 157B such that the support legs move when the control arms are moved by the carrier 147 or other components of the clip assembly 120. As shown in FIGS. 8 and 9, the first support leg 155A is joined with a first control arm 154A, while the second support leg 155B is joined with a second control arm 154B. This connection can be made via respective connectors 157A and 157A. These connectors can be integrally formed with a respective support legs and control arms. For example, the first support leg 155A can be formed from the same homogeneous piece of material as the connector 157A. The connector 157A can transition and be joined with the first control arm 154A which optionally can be parallel to the central plane CP when the support legs are deployed as shown in FIG. 10. This connection of the first control arm 154A to the first support leg 155A of the connector 157A can allow all of these components to move in unison, that is, when the control arm 154A is moved toward and/or away from the central plane CP, the leg 155A also moves toward and/or away from the central plane CP. As a result, the corresponding stop surface 156A can simultaneously move toward and away from the central plane CP. The stop surface 156A further optionally can move through an angle as explained in connection with the current embodiment of the clip assembly 10 above as it does so because that surface can rotate about an axis during such movement.

As mentioned above, the clip 30 can include additional support legs 155A' and 155B', these support legs also can be joined with respective control first control arm 154A and second control arm 154B as well as the respective loops 158A and 158B. Thus, the loops can affect movement of the additional optional support legs 155A' and 155B', which also can include connectors that further join with the respective first and second control arms to provide movement when the carrier moves within the void.

As shown in FIGS. 9 and 10, the actuator 140 is operable to engage the carrier 147 in a first mode and in a second mode. In the first mode, the actuator 140, for example, the fastener, can be installed relative to the base and in threaded engagement with the carrier 147. Again, this first mode can be associated with a transport mode or initial installation mode of the clip assembly 120 relative to the panel 100. In this mode, the carrier 147 can be disposed a distance D7 away from the base 121. The fastener 140 may or may not be exerting a force against the carrier 147 to hold it this distance D7 away from the base. When in the first mode, the carrier 147, and in particular its displacement control elements 144A and 144B, can be in direct engagement with the respective control arms 154A and 154B. This in turn, exerts forces F3 and F4 on those control arms in this configuration, because the control arms 154A and 154B are joined via connectors with the respective first support leg 155A and second support leg 155B. With these forces exerted by the carrier on the first and second support legs, through the control arms and connectors, those legs are retained within the void 130V, and/or generally do not pass substantially beyond the respective sidewalls 131, 132. As mentioned above, the first and second support legs in the first mode can be positioned within the void and aligned with the slots in this, in which the support legs are retracted. Optionally, although not shown, the respective displacement control elements can be of a sufficient thickness such that they can fill in the space between the respective sidewalls and control arms. For example, although not shown, the displacement control element 144A can be disposed between the interior surface 1321 of the sidewall 132 and can extend to the control arm 154A, such that the element 144A contacts both components. Optionally, the displacement control element 144A can push the control arm 154A with a force F3 away from the sidewall 132 toward the central plane CP in the first mode shown for example in FIG. 9.

The carrier also is operable, optionally via the actuator 140 in a second mode. In the second mode, the threaded fastener or actuator can be rotated relative to the threaded aperture in the carrier such that the support legs extend to the extended mode in which they reconfigure, and are readied to engage the second side 100B of the panel 100 to prevent removal of the clip assembly 120 from the panel aperture 100, similar to the embodiment described above. More particularly, upon rotation of the actuator, for example in direction R3, the carrier 147 can be moved upward or generally toward the base 121 in direction L3. As a result, the displacement control element 144A can be removed from the space between the sidewall and the control arm, or more generally away from the control arm. The ramped surface 144R can disengage the control arm 154A, and the control arm can move along with the connector and the associated support leg. The control arm 154A can become free to move away from the central plane CP and generally toward the sidewall 131. In so doing, the joined support leg 155A can move through the respective slot 132K such that the leg and stop surface extend a distance D8 from the sidewall 132 as shown for example in FIG. 10 in an extended mode. Of course, the other displacement control element 144B can interact with the control arm 154B and second support leg 155B in a similar manner to deploy that second support leg simultaneously with the first support leg relative to the body 130 and sidewall 131. The support leg 155B also can move in a direction opposite the first leg 155A, away from the central plane CP and out through the respective slot 132K so that the second leg also attains the deployed or extended mode, in which it can prevent or inhibit removal of the clip assembly from the panel aperture 102. Any other displacement control elements likewise can deploy associated support legs.

Optionally, if the clip assembly 120 is to be removed from the panel 100, the actuator 140 can be rotated in a direction opposite R3. As a result, the carrier 147 can transition from the configuration shown in FIG. 10 to that shown in FIG. 9. The support legs 155A and 155B can be retracted into the void 130V. Thus, in this configuration, the support legs do not offer restriction to clip assembly from being withdrawn from the aperture 102 of the panel and the clip assembly can be removed therefrom, in some cases, with the respective retention legs 131L and 132L being compressed during that removal.

Further optionally, with a clip assembly 120 installed relative to a panel 100 as shown in FIG. 10, the actuator 140 sometimes can be removed from the clip assembly and from the carrier. The clip assembly 120 can remain attached and secured to the panel 100 via the support legs 155A and 155B, and the any other support legs in their deployed or extended mode because the carrier remains in the second mode shown there in FIG. 10. After the fastener 140 is removed, another element, such as a bracket, mount, harness, clip, plate or other component can be installed relative to the fastener. The fastener 140 then can be placed through the hole 123 of the base 121 and threaded into the hole 147H of the carrier 147. Any element attached to the fastener 140 can thereby be secured to the panel via the clip assembly and the fastener 140.

Figure 11:
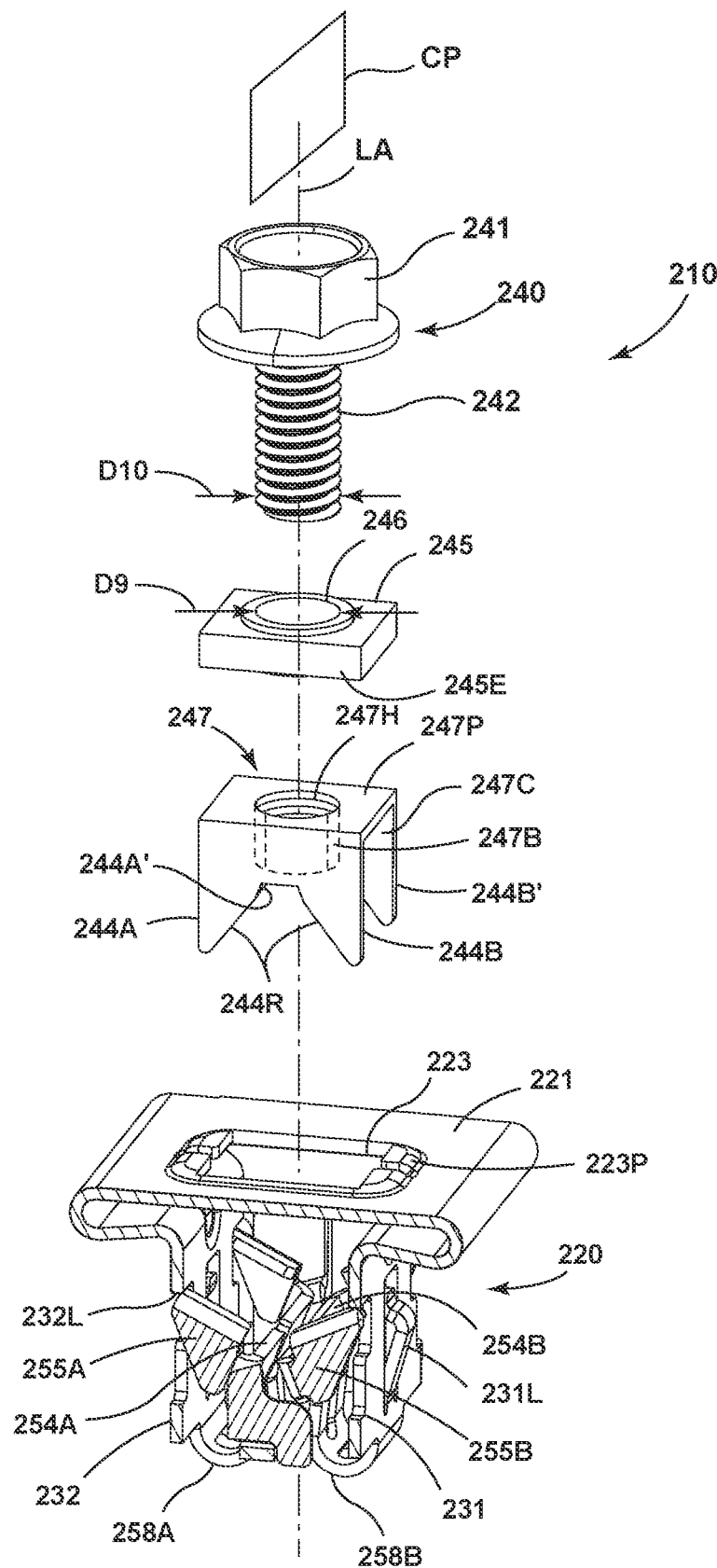
FIG. 11 is an exploded perspective view of a clip assembly of a second alternative embodiment.
Figure 12:
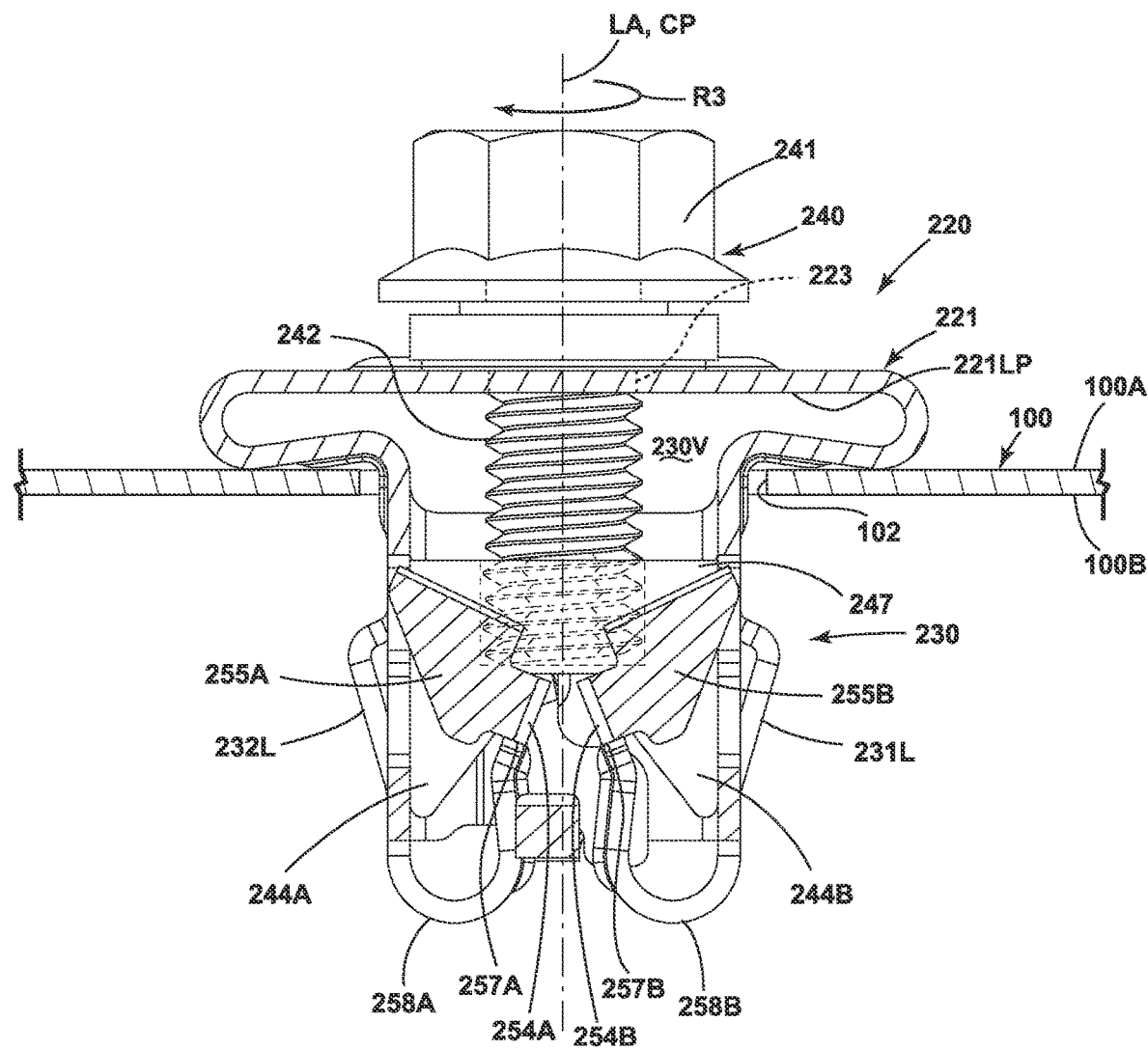
FIG. 12 is a side section view of the clip assembly of the second alternative embodiment installed relative to a panel aperture of a panel and support legs in a retracted mode before deployment.
Figure 13:
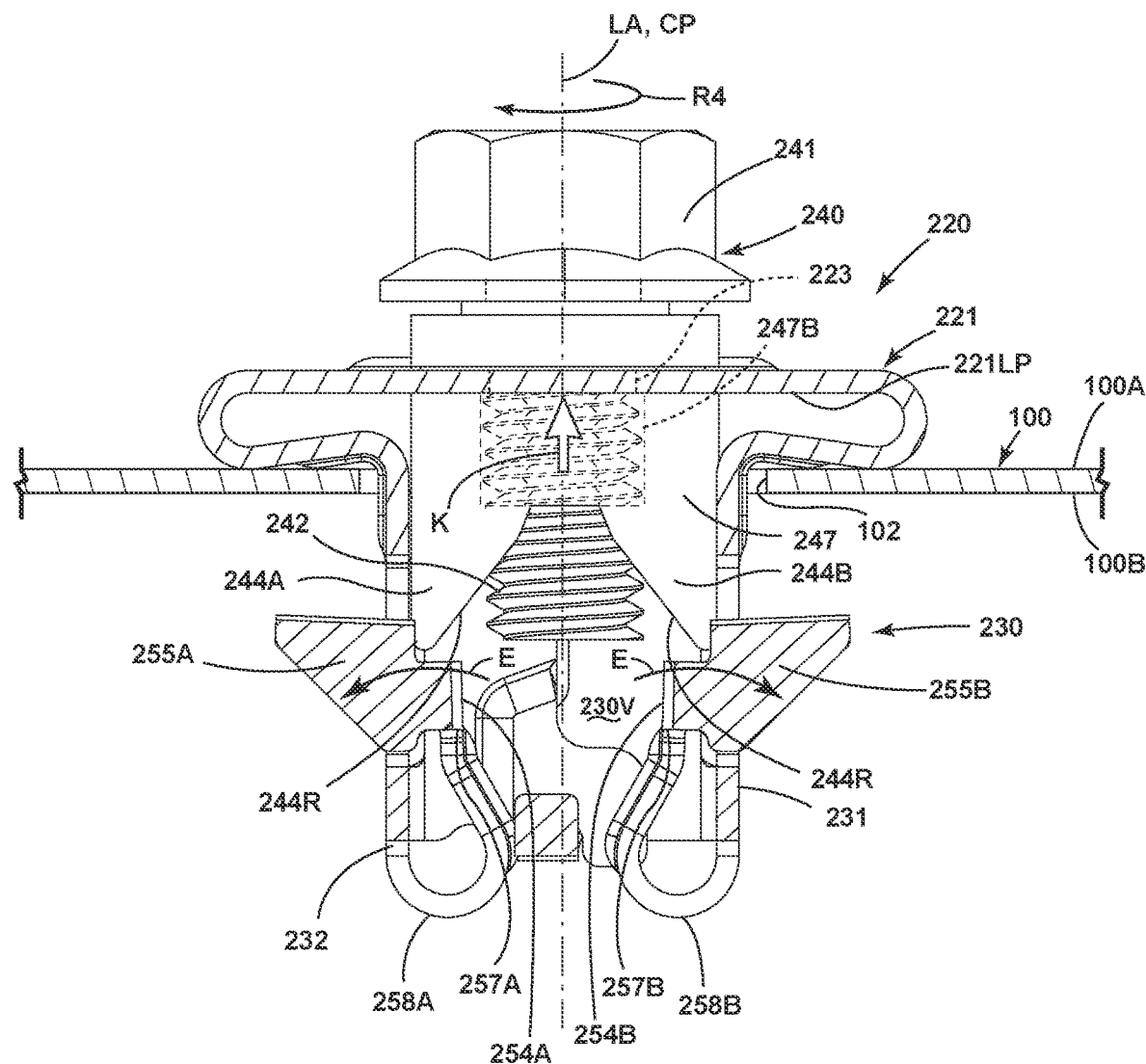
FIG. 13 is a side section view of the clip assembly of the second alternative embodiment installed relative to the panel aperture of the panel and support legs in an extended mode after deployment and movement of an actuator relative to a carrier to provide such deployment.

A second alternative embodiment of the clip assembly is shown in FIGS. 11-13, and generally designated 210. This clip assembly can be identical or similar to the embodiments described above in structure, function and operation, with one or more exceptions. For example, the clip assembly 210 can include a clip 220 having a base 221 and a body 230, with an actuator 240. The actuator 240 can be in the form of a fastener including a head 241 and a threaded shaft 242 as described in connection with the first alternative embodiment of the clip assembly 110 described above. The body 230 and all of the respective retention legs 231L, 232L, sidewalls 231, 232, control arms 254A, 254B, support legs 255A, 255B, loops 258A, 258B can be identical to the same components in the clip assemblies 10, 110 in the embodiments above and therefore will not be described again in detail here.

In the embodiments shown in FIGS. 11-13, however, the actuator 240 can be joined with a carrier 247 that functions as same, but is of a slightly different construction, than that of the embodiments above. In particular, the carrier 247 can be disposed within the body 230 and movable within the void 230V. With regard to function, when moved via rotation of the actuator 240, in a manner similar to that of the first alternative embodiment above, the carrier 247 can cause the one or more control arms 254A, 254B to move, thereby causing the respective support legs 255A, 255B (and any other support legs associated with the clip assembly 210) to extend from a retracted mode to a deployed mode. With regard to construction, the carrier 247 can include a top plate 247P. The top plate 247P can include a barrel 247B that extends downward from the top plate 247P, generally between the first set 244A, 244B of the displacement control elements and a second set 244A' and 244B' of the displacement control elements, within a void or channel 247C there between. This barrel 247B can be threaded and can define the threaded hole 247H, which receives the threaded fastener 240 and in particular the shaft 242 thereof. This carrier 247 also can include the respective displacement control elements 244A, 244B, 244A', 244B', which can be similar or identical to the spacer control elements described in connection with the first alternative embodiment of the clip assembly 110 above. For this reason, these displacement control elements will not be described again in detail here.

This embodiment of the clip assembly 210 also can include a different type of retention element 245 than that described in the embodiments above. The retention element 245 can ensure that the actuator 240 does not become dislodged from, fall or otherwise become dissociated from the clip 220 during transportation of the clip assembly 210.

As shown in FIGS. 11 and 13, the retention element 245 can be in the form of a block defining an aperture 246 through which the threaded shaft 242 projects. This aperture generally can be unthreaded so that the shaft 242 can rotate therein freely while engaging the threads of the hole 247H in the carrier 247. The block 245 can include one or more edges 245E. These edges 245E can be adhered, bonded, or otherwise secured to a perimeter 223P of the aperture 223 defined by the base 221. With the block 245 secured to the base in a fixed manner, the shaft 242 can be placed through it. Optionally, the dimension D9 of the aperture 246 can be slightly less than the diameter D10 of the shaft. Thus, when the shaft 242 is placed therein, the shaft can frictionally engage the block 245 to secure the actuator relative to the remainder of the clip assembly. Of course, other retention elements can be substituted for the block as shown in this embodiment.

The clip assembly 210 operate and function similarly to the embodiments described above, and therefore the operation and function of this embodiment will not be described again in detail here. Suffice it to say that, as shown in FIG. 12, the clip assembly 210 can be placed partially through a panel aperture 102 of a panel 100. The retention legs 231L and 232L can be compressed, then expand to temporarily secure the clip assembly 210 to the panel after installation through the panel aperture 102. In the configuration shown in FIG. 12, the carrier and actuator can be in a first mode in which the carrier 247 and the respective displacement control elements 244A and 244B engage the respective control arms 254A and 254B which in turn hold the support legs 255A and 255B in the retracted mode.

To convert the support legs 255A and 255B to a deployed mode in which they can engage the panel and prevent the clip assembly 210 from being removed from the panel, the actuator 240 can be rotated in direction R4. In so doing, the threaded shaft of the fastener engages the threads within the barrel 247B. In response, the carrier 247 moves linearly upward in direction K. As it does, the displacement control elements 244A and 244B of the carrier 247 disengage the respective control arms 254A and 254B. The control arms and associated support legs 255A and 255B thus rotate outward in direction E beyond the sidewalls 231 and 232 respectively. As a result, those support legs attain a deployed mode and can hold the clip assembly 230 in fixed securement relative to the panel so that it cannot be withdrawn from the panel aperture 102 or the panel in general.

The following additional Statements illustrate further embodiments, the numbering of which is not to be construed as designating levels of importance. Moreover, it is to be understood that the Statements of embodiments recited below are provided in conjunction with and in addition to the embodiments described above, as well as those claimed even farther below. Alternative embodiments that result from combining, integrating, and/or omitting features of the embodiments of the Statements below or any other embodiment described herein may also be within the scope of the present invention.

Statement A: A clip assembly for attaching a component to a panel, the clip assembly comprising: a clip comprising: a base defining a key hole and including a border element extending around the hole, the base configured to be placed adjacent a first side of a panel defining a panel aperture; a body extending from the base, the body including first and second retention legs configured to retract when engaged with a perimeter of the panel aperture and extend when placed on a second side of the panel, opposite the first side, to retain the clip relative to the panel, the body including first and second support legs distal from the first and second retention legs, the first and second support legs joined with respective first and second control arms; a grenade pin comprising: a grasping element; a key extending from the grasping element and including a first displacement control element and a second displacement control element, the first displacement control element operable to engage the first control arm and hold the first support leg in a retracted mode, the second displacement control element operable to engage the second control arm and hold the second support leg in a retracted mode, wherein the grenade pin is removably joined with the clip and operable in a first mode in which the grenade pin extends at least partially through the key hole, with the first displacement control element engaging the first control arm to hold the first support leg in the retracted mode, with the second displacement control element engaging the second control arm to hold the second support leg in the retracted mode, and operable in a second mode, in which the grenade pin is removed from the key hole such that the first support leg and the second support leg extend to an extended mode such that the first support leg and second support leg are configured to engage the panel to prevent removal of the clip assembly from the panel aperture.

Statement B. The clip assembly of Statement A, wherein the grenade pin includes a retention element that engages the base to retain the key inserted in the key hole.

Statement C: The clip assembly of any preceding Statement, wherein the retention element includes a shoulder and a flange, wherein the border element is trapped between the shoulder and the flange when the grenade pin is in the first mode.

Statement D: The clip assembly of any preceding Statement, wherein the first support leg includes a first connector that extends to and is joined with the first control arm such that the first control arm and the first support leg move in unison when the first support leg transitions to the extended mode, wherein the second support leg includes a second connector that extends to and is joined with the second control arm such that the second control arm and the second support leg move in unison when the second support leg transitions to the extended mode.

Statement E: The clip assembly of any preceding Statement, wherein the first support leg extends through the first support leg slot a first distance in the extended mode.

Statement F: The clip assembly of any preceding Statement, wherein the first support leg extends through the first support leg slot a second distance in the retracted mode, the second distance being less than the first distance.

Statement G: The clip assembly of any preceding Statement, wherein the grasping element forms a ring, wherein the body defines a void below the base, wherein the key extends through the key hole and into the void below the base.

Statement H: The clip assembly of any preceding Statement, wherein the body includes a first sidewall, wherein the first displacement control element engages the first control arm to bias the first support leg into the void and inward from the sidewall when in the retracted mode.

Statement I: The clip assembly of any preceding Statement, wherein the body defines a central plane, wherein the first support leg is biased toward the central plane via interaction of the first displacement control element with the first control arm, which is joined with the first support leg.

Statement J: The clip assembly of any preceding Statement, wherein the first retention leg extends from a sidewall of the body, wherein the first support leg extends from the sidewall in the extended mode distal from the first retention leg.

Statement K: The clip assembly of any preceding Statement, wherein the body includes a sidewall having a first loop joined with the first control arm which is joined with the first support leg via a first connector, wherein the first control arm is biased away from the sidewall via interaction of the first control arm with the first displacement control element.

Statement L: A clip assembly for attaching a component to a panel, the clip assembly comprising: a clip comprising: a base defining a key hole and configured to be placed adjacent a first side of a panel defining a panel aperture; a body extending from the base, the body including a retention leg to retain the clip relative to the panel upon initial installation of the clip relative to the panel, the body including a support leg distal from the retention leg, the support leg joined with a control arm; a grenade pin comprising: a grasping element; a key extending from the grasping element and including a displacement control element operable to engage the control arm and hold the support leg in a retracted mode, wherein the grenade pin is removable from the clip to disengage the displacement control element from the control arm and thereby deploy the support leg from the body to secure the clip to the panel.

Statement M: The clip assembly of any preceding Statement, wherein the grenade pin is operable in a first mode in which the grenade pin extends at least partially through the key hole, with the displacement control element engaging the control arm to hold the support leg in the retracted mode, and in a second mode, in which the grenade pin is removed from the key hole such that the support leg automatically extends to an extended mode such that the support leg is configured to engage the panel to prevent removal of the clip assembly from the panel aperture.

Statement N: The clip assembly of any preceding Statement, wherein the retention leg secures the clip to the panel while the support leg is in both the extended mode and in the retracted mode.

Statement O: The clip assembly of any preceding Statement, wherein the body includes a sidewall, wherein the displacement control element biases the control arm away from the sidewall in the retracted mode such that the support leg is drawn into the body.

Statement P: The clip assembly of any preceding Statement, wherein the body includes a sidewall, wherein a loop extends from the sidewall to the control arm, wherein the displacement control element engages the control arm so that the control arm is displaced a greater distance from the sidewall when the support leg is in the retracted mode than in the extended mode.

Statement Q: The clip assembly of any preceding Statement, wherein the key is disposed in the keyhole while the retention leg secures the clip to the panel, wherein the displacement control element is disposed between the control arm and a sidewall of the body.

Statement R: A method of using a clip assembly, the method comprising: providing a clip in a panel aperture of a panel, the clip including a retention leg to retain the clip relative to the panel, the body including a support leg distal from the retention leg, the support leg joined with a control arm and in a retracted mode; and removing a grenade pin from the clip to disengage a displacement control element of the grenade pin from the control arm and thereby deploy the support leg from the body in an extended mode to secure the clip to the panel while the retention leg retains the clip relative to the panel.

Statement S: The method of any preceding Statement, wherein the body includes a sidewall, wherein the removing includes removing the displacement control element from a position located between the sidewall and the control arm.

Statement T: The method of any preceding Statement, comprising simultaneously deploying a plurality of other support legs from slots defined by the body upon removal of the grenade pin from the body.

It will be appreciated that by identifying or naming herein certain elements as first, second, third, etc., that does not require that there always be a certain number of elements preceding, succeeding, above, below, adjacent and/or near the numbered elements. Further, any one of a numbered group of elements, for example, a third element, alternatively can be referred to as a first, second, fourth or other numbered elements. The same is true for the naming of any other elements in the form of a first element, second element, third element, etc. as used herein.

Although the different elements and assemblies of the embodiments are described herein as having certain functional characteristics, each element and/or its relation to other elements can be depicted or oriented in a variety of different aesthetic configurations, which support the ornamental and aesthetic aspects of the same. Simply because an apparatus, element or assembly of one or more of elements is described herein as having a function does not mean its orientation, layout or configuration is not purely aesthetic and ornamental in nature.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

What is claimed is:

1. A clip assembly for attaching a component to a panel, the clip assembly comprising:
   a clip comprising:
      a base defining a hole and including a border element extending around the hole, the base configured to be placed adjacent a first side of a panel defining a panel aperture;
      a body extending from the base, the body including first and second retention legs configured to retract when engaged with a perimeter of the panel aperture and to extend when placed on a second side of the panel, opposite the first side, to retain the clip relative to the panel, the body including first and second support legs distal from the first and second retention legs, the first and second support legs joined with respective first and second control arms;
   an actuator projecting through the hole and below the base;
   a carrier including a first displacement control element and a second displacement control element, the first displacement control element operable to engage the first control arm and hold the first support leg in a retracted mode, the second displacement control element operable to engage the second control arm and hold the second support leg in a retracted mode,
   wherein the actuator is operable to engage the carrier in a first mode in which the first displacement control element engages the first control arm to hold the first support leg in the retracted mode, with the second displacement control element engaging the second control arm to hold the second support leg in the retracted mode,
   wherein the actuator is operable to engage the carrier in a second mode, in which the first support leg and the second support leg extend to an extended mode such that the first support leg and the second support leg are configured to engage the panel to prevent removal of the clip assembly from the panel aperture.

2. The clip assembly of claim 1,
   wherein the actuator is a threaded fastener including a head and a threaded shaft,
   wherein the carrier defines a carrier aperture that is threaded and threadably engages the threaded shaft to promote displacement of the carrier relative to the base when the threaded fastener is rotated.

3. The clip assembly of claim 2,
   wherein the carrier moves toward the base and away from the first and second control arms when the threaded fastener is rotated in a first direction.

4. The clip assembly of claim 3,
   wherein the carrier moves away from the base and toward the first and second control arms when the threaded fastener is rotated in a second direction, opposite the first direction.

5. The clip assembly of claim 1,
   wherein the first support leg extends through the first sidewall slot a first distance in the extended mode.

6. The clip assembly of claim 5,
   wherein the first support leg extends through the first sidewall slot a second distance in the retracted mode, the second distance being less than the first distance.

7. The clip assembly of claim 1,
   wherein the carrier includes a carrier base plate,
   wherein the first displacement element is a first carrier leg extending away from the carrier base plate,
   wherein the second displacement element is a second carrier leg extending away from the carrier base plate, distal from the first carrier leg.

8. The clip assembly of claim 7,
   wherein the body includes a first sidewall,
   wherein the first carrier leg engages the first control arm under the carrier base plate within the body to bias the first support leg into a void and inward from the first sidewall when in the retracted mode.

9. The clip assembly of claim 1,
   wherein the body defines a central plane,
   wherein the first support leg is biased toward the central plane via interaction of the first displacement control element with the first control arm, which is joined with the first support leg,
   wherein the first retention leg extends from a sidewall of the body,
   wherein the first support leg extends from the sidewall in the extended mode distal from the first retention leg on a same side of the body.

10. The clip assembly of claim 1 comprising:
    a retention element adjacent the base and the hole,
    wherein the actuator is a fastener including a head and a threaded shaft,
    wherein the retention element engages at least one of the head and the threaded shaft to secure the fastener to the clip,
    wherein the retention element permits rotation of the fastener while securing the fastener to the clip.

11. The clip assembly of claim 1,
    wherein the body includes a sidewall having a first loop joined with the first control arm which is joined with the first support leg via a first connector,
    wherein the first control arm is biased away from the sidewall via interaction of the first control arm with the first displacement control element.

12. A clip assembly for attaching a component to a panel, the clip assembly comprising:
    a clip comprising:
       a base defining a hole and configured to be placed adjacent a first side of a panel defining a panel aperture;
       a body extending from the base, the body including a retention leg to retain the clip relative to the panel by engaging a second side of the panel upon initial installation of the clip relative to the panel, the body including a support leg distal from the retention leg, the support leg joined with a control arm; and a threaded fastener operably coupled to a displacement control element that engages the control arm and holds the support leg retracted relative to the body in a first mode, and that engages the control arm permitting the support leg to extend relative to the body to a second mode in which the support leg engages the second side of the panel if the base is pulled away from the first side of the panel.

13. The clip assembly of claim 12 comprising:

a carrier moveably disposed in the body, the carrier including the displacement control element and defining a threaded aperture to threadably receive the threaded fastener, wherein the carrier is operable in the first mode in which the threaded fastener extends at least partially through the hole, with the displacement control element engaging the control arm to hold the support leg in a retracted mode, and in the second mode, in which the threaded fastener is rotated relative to the threaded aperture such that the support leg extends to an extended mode such that the support leg is configured to engage the second side of the panel to prevent removal of the clip assembly from the panel aperture.

14. The clip assembly of claim 13, wherein the retention leg secures the clip to the panel while the support leg is in both the extended mode and in the retracted mode.

15. The clip assembly of claim 12, wherein the body includes a sidewall, wherein the displacement control element biases the control arm away from the sidewall in a retracted mode such that the support leg is drawn into the body, wherein a loop extends from the sidewall to the control arm, wherein the displacement control element engages the control arm so that the control arm is displaced a greater distance from the sidewall when the support leg is in the retracted mode than in an extended mode.

16. The clip assembly of claim 12 comprising:

a carrier including the displacement control element and defining a threaded aperture to threadably receive the threaded fastener, wherein the threaded fastener projects through the hole and into the threaded aperture, wherein the carrier is rotationally constrained within the body, wherein upon rotation of the threaded fastener relative to the threaded aperture, the carrier in the displacement control element move relative to the control arm in a sliding manner so as to affect translation of the support leg relative to a sidewall of the body, thereby deploying the support leg through a sidewall slot defined by the body to an extended mode.

17. The clip assembly of claim 12, wherein the threaded fastener is disposed in the hole while the retention leg secures the clip to the panel, wherein the displacement control element is disposed between the control arm and a sidewall of the body.

18. A method of using a clip assembly, the method comprising:

providing a clip in a panel aperture of a panel, the clip including a retention leg to retain the clip relative to the panel, a body including a support leg distal from the retention leg, the support leg joined with a control arm and in a retracted mode; and rotating an actuator relative to a carrier rotatably constrained by the clip to disengage a displacement control element of the carrier from the control arm and thereby deploy the support leg from the body in an extended mode to secure the clip to the panel while the retention leg retains the clip relative to the panel.

19. The method of claim 18, wherein the body includes a sidewall, wherein the rotating results in the displacement control element being removed from a position between the sidewall and the control arm.

20. The method of claim 18 comprising:

simultaneously deploying a plurality of other support legs from a plurality of slots defined by the body upon rotation of the actuator relative to the body.

* * * * *